(12) United States Patent
Gushima

(10) Patent No.: US 6,181,655 B1
(45) Date of Patent: Jan. 30, 2001

(54) OPTICAL DISC DRIVE, TIMING SIGNAL GENERATOR, AND INFORMATION RECORDING AND REPRODUCTION METHOD

(75) Inventor: Toyoji Gushima, Habikino (JP)

(73) Assignee: Matsushita Electric Industrial Co., Ltd., Osaka (JP)

( * ) Notice: Under 35 U.S.C. 154(b), the term of this patent shall be extended for 0 days.

(21) Appl. No.: 09/200,856

(22) Filed: Nov. 27, 1998

(30) Foreign Application Priority Data

Nov. 28, 1997 (JP) .................................................. 9-327435

(51) Int. Cl.⁷ ....................................................... G11B 7/00
(52) U.S. Cl. ................................. 369/50; 369/59; 369/48
(58) Field of Search .................................... 369/47, 48, 49, 369/50, 54, 58, 59; 360/48, 51, 53

(56) References Cited

U.S. PATENT DOCUMENTS

| | | |
|---|---|---|
| 4,815,063 | 3/1989 | Aoshima et al. . |
| 5,315,571 | 5/1994 | Maeda et al. . |
| 5,339,301 | 8/1994 | Raaymakers et al. . |
| 5,377,178 | 12/1994 | Saito et al. . |
| 5,444,687 | 8/1995 | Okumura . |
| 5,448,543 | 9/1995 | Mizokami et al. . |
| 5,539,795 | 7/1996 | Takase . |
| 5,642,342 | 6/1997 | Murata . |
| 6,026,068 | * 2/2000 | Obata et al. ............................ 369/58 |
| 6,069,864 | * 5/2000 | Kim .................................... 369/48 X |

FOREIGN PATENT DOCUMENTS

| | | |
|---|---|---|
| 4319753A1 | 12/1993 | (DE) . |
| 0768647A1 | 4/1997 | (EP) . |
| 0821350A2 | 2/1998 | (EP) . |
| 59-213035 | 12/1984 | (JP) . |
| 60-145566 | 8/1985 | (JP) . |
| 8-255351 | 10/1996 | (JP) . |
| 9-231580 | 9/1997 | (JP) . |
| 10-91967 | 4/1998 | (JP) . |

* cited by examiner

Primary Examiner—Muhammad Edun
(74) Attorney, Agent, or Firm—Wenderoth, Lind & Ponack, L.L.P.

(57) ABSTRACT

An optical disc drive produces read gate signals for controlling the address and data read timing, and write gate signals for controlling the timing of data writing. During the disc speed is stable, the read gate signals and write gate signals are formed using the clock signal generated by an internal oscillator. However, when the disc speed becomes unstable, the read gates and write gates are formed using the clock signal generated by the signal reproduced from the disc.

18 Claims, 18 Drawing Sheets

OPTICAL DISC DRIVE, TIMING SIGNAL GENERATOR, AND INFORMATION RECORDING AND REPRODUCTION METHOD

BACKGROUND OF THE INVENTION

1. Field of the Invention

The present invention relates to an optical disc apparatus for recording and reproducing information to and from an optical disc; to a timing signal generator for generating a timing signal required for recording and reproducing information in an optical disc drive according to the present invention; and to an information recording and reproducing method for recording and reproducing information to and from an optical disc.

2. Description of the Related Art

Optical discs are widely used today as a high capacity information storage medium, and continue to be developed and marketed for use with computer storage peripherals and audio-visual recording.

An optical disc typically has a spiral track formed on the disc surface. Information is recorded and reproduced to and from the disc by means of a laser beam tracking and emitting a light spot to this track. The track is also typically divided into a plurality of sectors, which are the smallest units for recording and reproducing data on the disc.

FIG. 17 shows a typical example of a sector structure on a rewritable optical disc.

Each sector 1701 starts with a header area 1702 to which a signal containing address information is prerecorded by means of pits and lands in the optical disc surface. Though not shown in the figure, the header area 1702 may begin with a pattern of long marks, known as the sector mark, to make sector indexing easier using a pattern matching technique. The sector mark is used on, for example, rewritable optical discs conforming to the ISO/IEC 10090 standard. Alternatively, the header area 1702 may start with a repeating pattern of a specific period, known as a Variable Frequency Oscillator (VFO), for faster clock reproduction.

An optical disc drive typically manages the location of each data unit based on the address information in the header area 1702. It does this by indexing to a particular sector by detecting the sector mark pattern at the beginning of the header area 1702, or detecting a signal presence based on the envelope, and then reading the address information from the header area 1702. This also makes it possible to search and access data quickly and easily.

A gap 1703, data recording area 1704, and buffer area 1705 following the header area 1702 in succession. The gap 1703 is used, for example, for controlling the laser power for data recording and reproducing, and no data is recorded. The data recording area 1704 is where user data is actually recorded. Digital user data is recorded by adding an error correction code or other redundant checking code, and the modulating the digital data according to specific modulation rules for recording. The buffer area 1705 is provided as a means of absorbing variations in the rotational velocity of the disc, and has no signals recorded thereto.

Various methods are used for determining the sector arrangement, including constant linear velocity (CLV), constant angular velocity (CAV), an improved CAV method known as zoned CAV (ZCAV), and an improved CLV method known as zoned CLV (ZCLV).

In the CLV method, the disc motor is controlled so that the rotational velocity of the disc is inversely proportional to the disc radius, and the linear velocity of the recording and reproducing track (the "data track" below) is constant at any radial position on the disc. Disc storage capacity can thus be increased, and data can be recorded and reproduced synchronized to a constant clock. An advantage of the CLV method, therefore, is that substantially the same recording and reproducing conditions can be used at all track positions from the inside to the outside circumference of the disc.

In the CAV method, the disc motor speed and the recording/reproducing frequency remain constant. Rotational control is therefore simple, and a small motor can be used. The drawback to this method is that the total storage capacity of the disc is reduced.

The ZCAV method was developed to address the problem of low overall storage capacity while retaining the simple rotational control of the CAV method. In zoned CAV the disc speed remains constant, as in the CAV method, but the optical disc is divided radially into a plurality of zones, each containing a specific number of tracks. The recording/reproducing frequency is then changed in each zone from the inside circumference to the outside circumference of the disc. Storage capacity approaching that of CLV discs can thus be achieved.

The ZCLV method addresses the greater complexity of motor control required for CLV control. That is, the recording/reproducing frequency is kept constant, the disc is divided into a plurality of zones similarly to the CAV method, and the angular velocity of the disc is decreased in each zone from the inside circumference to the outside circumference of the disc. Storage capacity therefore remains comparable to that of the CLV method while disc motor control is simplified compared with CLV control.

Various methods of deriving a reference clock have been proposed for rewritable optical disc formats. These include a so-called sample servo method in which pits are preformed at a constant interval in a zigzag pattern centered on the track center, and these "clock pits" are detected to generate a reference clock for data recording and reproducing. Another method is to form a "wobble groove", an undulating sine wave shaped groove, centered on the track center, and reproduce a wobble signal recorded to this wobble groove to generate the reference clock for data recording and reproducing.

The period of the undulations in the wobble groove is normally sufficiently longer than the channel bit period of the recorded data, and is typically an integer multiple of the channel pit period. This improves the frequency divisibility of the data reproduction signal with the wobble signal, and makes it relatively simple to derive a reference clock.

A wobble groove can be used together with a sector structure, as shown in FIG. 17, having a header area in which address information is recorded by preformed pits. A land and groove recording method whereby address information is recorded using pits in the header area, a wobble groove is formed in the data recording area, and user data is recorded using both the groove and areas between adjacent grooves ("lands"), has been recently proposed. This land and groove method is currently used as a recording method for recent high density rewritable optical discs in combination with the above-described ZCLV control method.

To record and reproduce data using an optical disc with a sector structure as described above, common optical disc drives typically generate gate signals, such as a write gate and read gate, and use the timing derived from these gate signals to determine the beginning and end of data recording and reproducing. Such conventional drives further comprise a counter for counting the reference clock, and determine the gate signal timing based on the generated count.

With the ZCLV control method described above, however, there is a certain delay required for the disc motor to settle to the specific speed when searching between zones because the angular velocity of the disc changes from zone to zone. This means that when timing is based on a reference clock, data recording and reproducing cannot start until the disc motor stabilizes at a rotational speed corresponding to the reference clock.

Furthermore, it is also necessary to change the frequency of the clock used as the reference for recording and reproducing when the optical disc drive starts up, and when searching across zones, when using a ZCAV optical disc because the recording/reproducing frequency differs from zone to zone.

The time required for the optical disc drive to start up, and the time required for disc searches, is thus increased (slowed) when using ZCLV optical discs and when using ZCAV optical discs.

SUMMARY OF THE INVENTION

It is therefore an object of the present invention to provide an optical disc drive enabling fast start up and searching when using ZCLV or ZCAV type optical discs, and to enable address information reproduction and data recording and reproduction with good precision.

To achieve the aforementioned object, an optical disc drive according to the present invention comprises a signal reading means for reading a signal from an optical disc; a recording means for recording information to the optical disc; a clock reproducing means for reproducing a first clock from a reproduction signal read by the signal reading means; an address reproducing means for reproducing an address from the reproduction signal read by the signal reading means; a reference clock generating means for generating a second clock, which is used as a reference for recording; a first counter for counting a length of one sector on the optical disc using the first clock; a second counter for counting a length of one sector on the optical disc using the second clock and a timing signal generator for generating a timing signal for controlling operation of the recording means, clock reproducing means and address reproducing means using counter output from the first and second counters.

An optical disc drive according to a further version of the present invention comprises: a signal reading means for reading a signal from an optical disc; a recording means for recording information to the optical disc; a clock reproducing means for reproducing a first clock from a reproduction signal read by the signal reading means; an address reproducing means for reproducing an address from the reproduction signal read by the signal reading means; a reference clock generating means for generating a second clock, which is used as a reference for recording; a clock selecting means for time-share selection of the first clock and second clock, and outputting a third clock; a third counter for counting a length of one sector on the optical disc using the third clock; and a timing signal generator for generating a timing signal for controlling operation of the recording means, clock reproducing means, and address reproducing means using the counter output from the third counter.

An optical disc drive according to a further version of the present invention comprises: a signal reading means for reading a signal from an optical disc; a recording means for recording information to the optical disc; a first clock reproducing means for reproducing a first clock from a reproduction signal read by the signal reading means; a second clock reproducing means for reproducing a second clock from a reproduction signal read by the signal reading means; an address reproducing means for reproducing an address from the reproduction signal read by the signal reading means; a first counter for counting a length of one sector on the optical disc using the first clock; a second counter for counting a length of one sector on the optical disc using the second clock; and a timing signal generator for generating a timing signal for controlling operation of the recording means, clock reproducing means, and address reproducing means using the counter output from the first and second counters.

An optical disc drive according to a further version of the present invention comprises: a signal reading means for reading a signal from an optical disc; a recording means for recording information to the optical disc; an envelope detection means for detecting the envelope of a reproduction signal read by the signal reading means; a clock reproducing means for reproducing a first clock from a reproduction signal read by the signal reading means; an address reproducing means for reproducing an address from the reproduction signal read by the signal reading means; a reference clock generating means for generating a second clock, which is used as a reference for recording; a first counter for counting a length of one sector on the optical disc using the first clock; a second counter for counting a length of one sector on the optical disc using the second clock; and a timing signal generator for generating a timing signal for controlling operation of the recording means, clock reproducing means, and address reproducing means using the envelope detection signal output by the envelope detection means, counter output from the first counter, and counter output from the second counter.

An optical disc drive according to a further version of the present invention comprises: a signal reading means for reading a signal from an optical disc; a recording means for recording information to the optical disc; an envelope detection means for detecting the envelope of a reproduction signal read by the signal reading means; a clock reproducing means for reproducing a first clock from a reproduction signal read by the signal reading means; an address reproducing means for reproducing an address from the reproduction signal read by the signal reading means; a reference clock generating means for generating a second clock, which is used as a reference for recording; a clock selecting means for time-share selection of the first clock and second clock, and outputting a third clock; a third counter for counting a length of one sector on the optical disc using the third clock; and a timing signal generator for generating a timing signal for controlling operation of the recording means, clock reproducing means, and address reproducing means using an envelope detection signal output by the envelope detection means, and counter output from the third counter.

An optical disc drive according to a further version of the present invention comprises: a signal reading means for reading a signal from an optical disc; a recording means for recording information to the optical disc; an envelope detection means for detecting the envelope of a reproduction signal read by the signal treading means; a [first] clock reproducing means for reproducing a first clock from a reproduction signal read by the signal reading means; a [second] clock reproducing means for reproducing a second clock from a reproduction signal read by the signal reading means; an address reproducing means for reproducing an address from the reproduction signal read by the signal reading means; a first counter for counting a length of one sector on the optical disc using the first clock; a second counter for counting a length of one sector on the optical disc using the second clock; and a timing signal generator for generating a timing signal for controlling operation of the recording means, clock reproducing means, and address reproducing means using an envelope detection signal output by the envelope detection means, counter output from the first and second counters.

The present invention further provides a timing signal generator for generating a timing signal required for recording and reproducing in an optical disc drive in which information is recorded and reproduced in sector units on an optical disc. This timing signal generator comprises: a first counter for counting a length of one sector on the optical disc using a first clock reproduced from the optical disc; a second counter for counting a length of one sector on the optical disc using a second clock, which is used as a reference for recording to the optical disc; a first decoding circuit for decoding counter output from the first counter, and generating a first gate signal of a specific width; a second decoding circuit for decoding counter output from the second counter, and generating a second pate signal of a specific width; and a selection circuit for selecting the first gate signal or second gate signal based on the condition of optical disc rotation, and outputting the selected gate signal as a timing signal.

A further timing signal generator according to the present invention for generating a timing signal required for recording and reproducing in an optical disc drive in which information is recorded and reproduced in sector units on an optical disc comprises: a first counter for counting a length of one sector on the optical disc using a first clock reproduced from the optical disc; a second counter for counting a length of one sector on the optical disc using a second clock reproduced from the optical disc; a first decoding circuit for decoding counter output from the first counter, and generating a first gate signal of a specific width; a second decoding circuit for decoding counter output from the second counter, and generating a second gate signal of a specific width; and a selection circuit for selecting the first gate signal or second gate signal based on the state of the second clock, and outputting the selected gate signal as a timing signal.

The present invention further provides a timing signal generator for generating a timing signal required for recording and reproducing in an optical disc drive in which information is recorded and reproduced in sector units while reading address information preassigned to each sector unit, where sector units are formed by segmenting a track on an optical disc into a plurality of segments. This timing signal generator comprises: a delay circuit for delaying by a specific delay time an envelope signal detected from a signal reproduced from the optical disc; an AND circuit for obtaining the AND of the envelope signal and the delayed output from the delay circuit; a first counter for counting a length of one sector on the optical disc using a first clock reproduced from the optical disc; a second counter for counting a length of one sector on the optical disc using a second clock, which is used as a reference for recording to the optical disc; a first decoding circuit for decoding counter output from the first counter, and generating a first gate signal of a specific width; a second decoding circuit for decoding counter output from the second counter, and generating a second gate signal of a specific width; and a selection circuit for selecting the AND circuit output, the first gate signal, or the second gate signal based on the condition of optical disc rotation and the address information read state, and outputting the selected signal as a timing signal.

A further timing signal generator for generating a timing signal required for recording and reproducing in an optical disc drive in which information is recorded and reproduced in sector units while reading address information preassigned to each sector unit, where sector units are formed by segmenting a track on an optical disc into a plurality of segments, comprises: a delay circuit for delaying by a specific delay time an envelope signal detected from a signal reproduced from the optical disc; an AND circuit for obtaining the AND of the envelope signal and the delayed output from the delay circuit; a first counter for counting a length of one sector on the optical disc using a first clock reproduced from the optical disc; a second counter for counting a length of one sector on the optical disc using a second clock reproduced from the optical disc; a first decoding circuit for decoding counter output from the first counter, and generating a first gate signal of a specific width; a second decoding circuit for decoding counter output from the second counter, and generating a second gate signal of a specific width; and a selection circuit for selecting the AND circuit output, the first gate signal, or the second gate signal based on the second clock state and the address information read state, and outputting the selected signal as a timing signal.

The present invention further provides an information recording and reproducing method for recording and reproducing information in sector units on an optical disc while reading address information preassigned to each sector unit, which are formed by segmenting a track on an optical disc into a plurality of segments. This method includes the following steps: an address error monitoring step for monitoring address information read errors in sector units; a disc rotation state monitoring step for monitoring whether the optical disc speed is within a specific range; a sector synchronization state evaluation step for evaluating the sector synchronization state based on the address error state monitored by the address error monitoring step; and a read/write enabling step for enabling recording or reproducing information based on the disc rotation state monitored by the disc rotation state monitoring step, and the sector synchronization state determined by the sector synchronization state evaluation step.

A further information recording and reproducing method according to the present invention is for recording and reproducing information in sector units on an optical disc by obtaining address information and a recording clock, which is used as a reference for recording information, from a signal reproduced from the optical disc. The sector units are formed by segmenting the optical disc track into a plurality of segments. Address information is preassigned to each sector. This information recording and reproducing method includes the following steps: an address error monitoring step for monitoring address information read errors in sector units; a recording clock state monitoring step for monitoring a state of the recording clock; a sector synchronization state evaluation step for evaluating the sector synchronization state based on the address error state monitored by the address error monitoring step; and a read/write enabling step for enabling recording or reproducing information based on the sector synchronization state determined by the sector synchronization state evaluation step, and the recording clock state.

BRIEF DESCRIPTION OF THE DRAWINGS

These and other objects and features of the present invention will be readily understood from the following detailed description taken in conjunction with preferred embodiments thereof with reference to the accompanying drawings, in which like parts are designated by like reference numerals and in which.

DESCRIPTION OF THE PREFERRED EMBODIMENTS

The preferred embodiments of the present invention are described below with reference to the accompanying figures.

Figure 1:
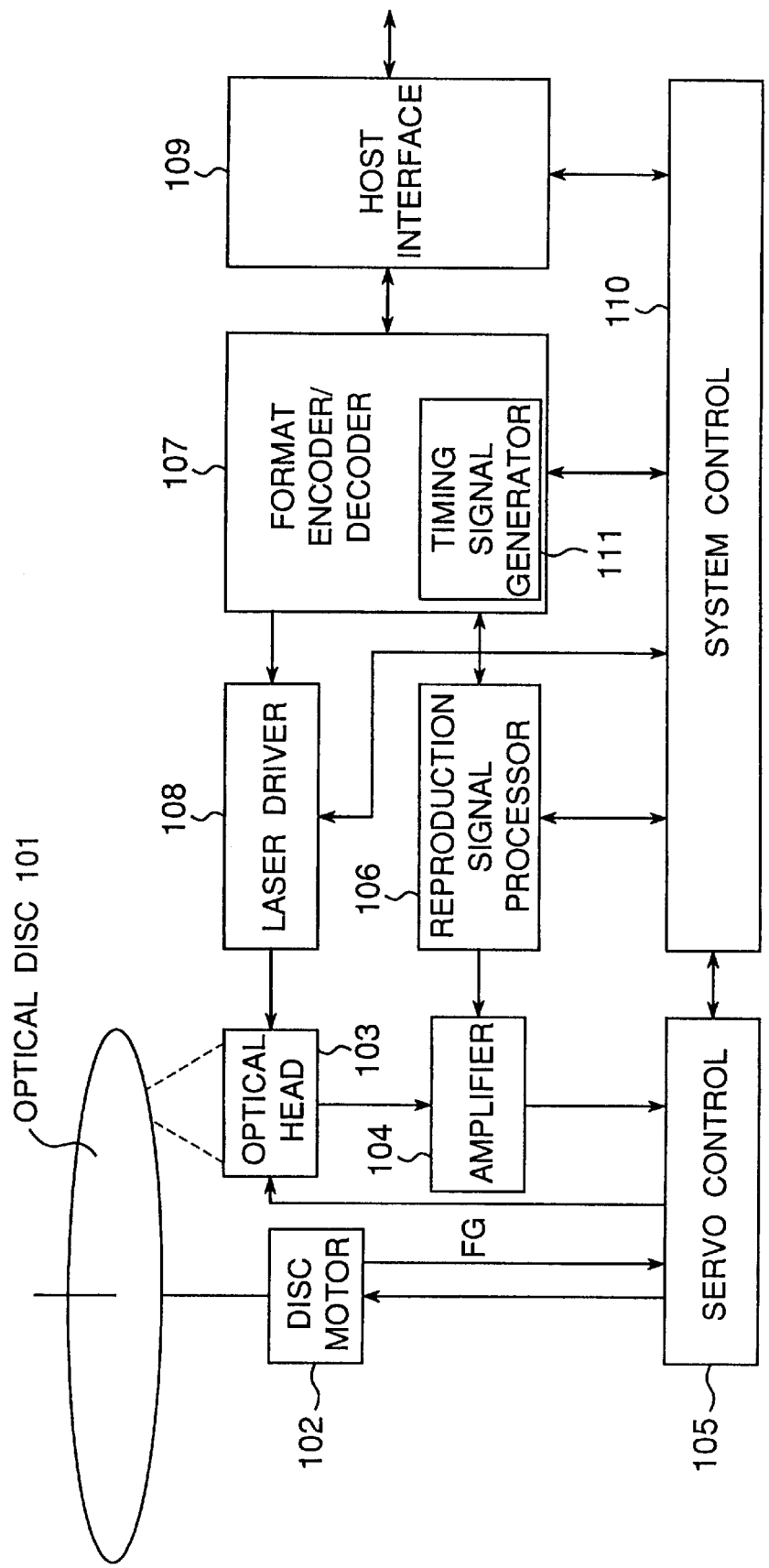
FIG. 1 is a block diagram of an optical disc drive according to the present invention.

FIG. 1 is a block diagram of an optical disc drive according to the present invention. Referring to FIG. 1, this optical disc drive comprises a disc motor 102 for driving an optical disc 101 at a specific angular velocity. An optical head 103 comprising a semiconductor laser, optics, photodetector, and other components not shown in the figures is driven for recording and reproducing data to and from the optical disc 101. Data recording and reproducing are accomplished by the optics of the optical head 103 concentrating a laser beam emitted from the semiconductor laser to focus a light spot on the recording surface of the optical disc 101. Light reflected back from the recording surface is again collected by the optics and converted to electrical current by a photodetector. This current is then voltage converted and amplified by an amplifier 104 to derive and output a reproduction signal.

A servo means 105 controls disc motor 102 rotation, movement of the optical head 103 radially to the optical disc 101, focusing the light spot on the recording surface, and tracking control to keep the light spot focused on the track center. Note that focusing control and tracking control use a focusing error signal and tracking error signal, respectively, contained in the reproduction signal output from the amplifier 104. The focusing error signal is an electrical signal indicative of the deviation of the light spot from the recording surface of the optical disc 101. The tracking error signal is an electrical signal indicative of the deviation of the light spot from a specific track of the optical disc 101.

A reproduction signal processor 106 extracts the signal component recorded to the optical disc 101 from the reproduction signal, digitizes the extracted signal, and reproduces a read clock and read data synchronized to the read clock from the digitized data and reference clock by means of an internal phase-locked loop (PLL).

The laser driver 108 generates a laser drive signal so that the semiconductor laser built in to the optical head 103 emits at a read power level when reproducing address information and user data from the disc, and emits at a write power level when recording data to the disc.

Based on the read clock and read data output from the reproduction signal processor 106, a format encoder/decoder 107 reproduces the address information recorded to a header area on the optical disc 101, and comprises a timing signal generator 111.

Based on this reproduced address information, the timing signal generator 111 generates and supplies timing signals required for recording and reproducing at a timing synchronized to a particular sector of the optical disc 101. For example, the timing signal generator 111 outputs a read gate or other timing signal required by the reproduction signal processor 106 for address and data digitizing and PLL processing. During recording, the timing signal generator 111 outputs a write gate or other timing signal to the laser driver 108 to enable emitting at the write power level.

During recording, the format encoder/decoder 107 adds redundant coding such as an error correction code to user data supplied through a host interface 109 from an external device. The format encoder/decoder 107 then modulates the signal according to a predetermined format, and supplies the modulated signal to the laser driver 108 as the data to be recorded as a bit sequence to disc. During reproduction, the format encoder/decoder 107 reproduces address information recorded to a header area of optical disc 101 based on the read clock and read data output from the reproduction signal processor 106, demodulates and error correction processes user data recorded to the data recording area, and then sends the error corrected data through host interface 109 to an external device.

The system controller 110 interprets commands supplied thereto through host interface 109 from an external device, and controls operation of the servo means 105, reproduction signal processor 106, format encoder/decoder 107, laser driver 108, and host interface 109 to record or reproduce data to a specific sector of the optical disc 101.

The timing signal generator 111, which is an essential part of an optical disc drive according to the present invention, can be achieved in various ways, and seven specific embodiments thereof are first described briefly and then in detail below.

Embodiment 1

A timing signal generator 111 according to a first version of the invention generates timing signals using a counting circuit for counting a read clock generated by a phase-locked loop from a reproduction signal, and a counting circuit for counting the reference clock for recording and reproducing operations.

Embodiment 2

A timing signal generator 111 according to a second version of the invention generates timing signals using a single counting circuit, driving the counting circuit to switch on a time-share basis between a read clock generated by a phase-locked loop from a reproduction signal, and the reference clock for recording and reproducing operations.

Embodiment 3

A timing signal generator 111 according to a third version of the invention generates timing signals using a counting circuit for counting a read clock generated by a phase-locked loop from a reproduction signal, and a counting circuit for counting a wobble clock reproduced from a wobble groove.

Embodiment 4

A timing signal generator 111 according to a fourth version of the invention generates timing signals using a counting circuit for counting a read clock generated by a phase-locked loop from a reproduction signal and the results of reproduction signal envelope detection, and a counting circuit for counting the reference clock for recording and reproducing operations.

Embodiment 5

A timing signal generator 111 according to a fifth version of the invention generates timing signals by driving the counting circuit to switch on a time-share basis between a read clock generated by a phase-locked loop from a reproduction signal, and the reference clock for recording and reproducing operations, and using the counting circuit and the results of reproduction signal envelope detection.

Embodiment 6

A timing signal generator 111 according to a sixth version of the invention generates timing signals using a counting circuit for counting a read clock generated by a phase-locked loop from a reproduction signal and the results of reproduction signal envelope detection, and a counting circuit for counting a wobble clock reproduced from a wobble groove.

Embodiment 7

A timing signal generator 111 according to a seventh version of the invention generates timing signals using a counting circuit for counting a read clock generated by a phase-locked loop from a reproduction signal and the results of reproduction signal envelope detection, and a counting circuit time-share switched between counting a reference clock and a wobble clock reproduced from a wobble groove.

Figure 2:
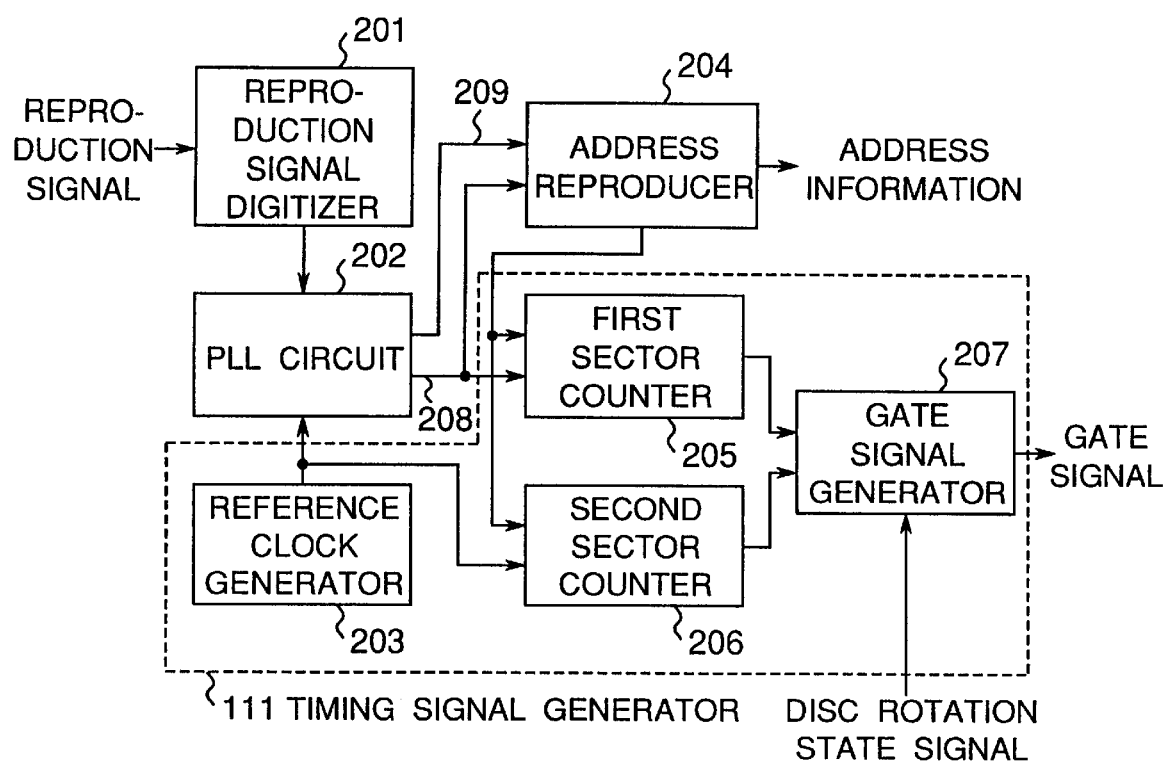
FIG. 2 is a block diagram of a timing signal generator 111 and surrounding components according to a first embodiment of the present invention.

A timing signal generator 111 according to a first embodiment of the present invention as shown in FIG. 2 is described first below. Referring to FIG. 2, a reproduction signal digitizer 201 digitizes a reproduction signal read from an optical disc. A PLL circuit 202 phase locks the digitized reproduction signal from the reproduction signal digitizer 201 with a reference clock from a reference clock generator 203, and outputs a read clock 208 synchronized to the reproduction signal, and read data 209, which is the reproduced data synchronized by read clock 208.

The reference clock generator 203 may be, for example, a quartz oscillator or frequency synthesizer (the specific configuration not shown in the figures), for generating and supplying a reference clock. It should be noted that a reference clock as used herein is a clock signal where one clock period is the time of one channel bit when the optical disc is spun at a predetermined angular velocity or linear velocity. For example, when recording or reproducing to a CAV, CLV, or ZCLV control type optical disc, the defined period of one channel bit is the same (constant) at every radial position on the disc. As a result, a quartz oscillator output can be used as supplied. When recording or reproducing a ZCAV type disc, however, the defined period of one channel differs in each zone. Quartz oscillator output must therefore be gradually adjusted by a different known factor in each zone to derive and output the reference clock. This reference clock is used by the format encoder/decoder 107 to generate the recording data, that is, the recording data is output in a format synchronized to the reference clock. The reference clock can also be used by the servo 105 for measuring time in the rotational control of disc motor 102.

An address reproducer 204 detects and reproduces address information using the read clock 208 and read data 209. The address reproducer 204 outputs this address information to the system controller 110, and outputs an address detection signal indicative of the timing at which the address information was detected when address error in a given sector is below a specific level. This address detection signal is a pulse signal output when the address information is detected without error, for example, and is used as a reference for sector synchronization. Roughly, there are about 17 to 40 sectors in one rotation track.

A first sector counter 205 is a circuit for counting the length of one sector using the read clock supplied from the PLL circuit 202. For example, if the length of one sector is 2697 bytes, and 1 byte equals 16 channel bits, the first sector counter 205 can be 16-bit loop counter that counts from 0 to 43,151 (=2697×16−1), and then resets to 0. Sector length can also be expressed as the bit or byte position count from a specific sector address position by presetting the counter to a specific value at the address detection signal timing.

A second sector counter 206 is a circuit for counting the length of one sector using the reference clock supplied from a reference clock generator. This second sector counter 206 can also be a loop counter as described above. Alternatively, sector length can be expressed, as described above, as the bit or byte position count from a specific sector address position by presetting the counter to a specific value at the address detection signal timing.

The gate signal generating circuit 207 generates and supplies the various gate signals for controlling the operation of other circuit blocks using the counter values output from the first and second sector counters 205 and 206.

The relationship between the precision of the actual sector positions and the counter values indicative thereof output from the first sector counter 205 and second sector counter 206 is considered below.

As noted above, the counter output from first sector counter 205 is the result of counting synchronized to the read clock, and counter precision is therefore dependent on the precision of the read clock.

Figure 17:
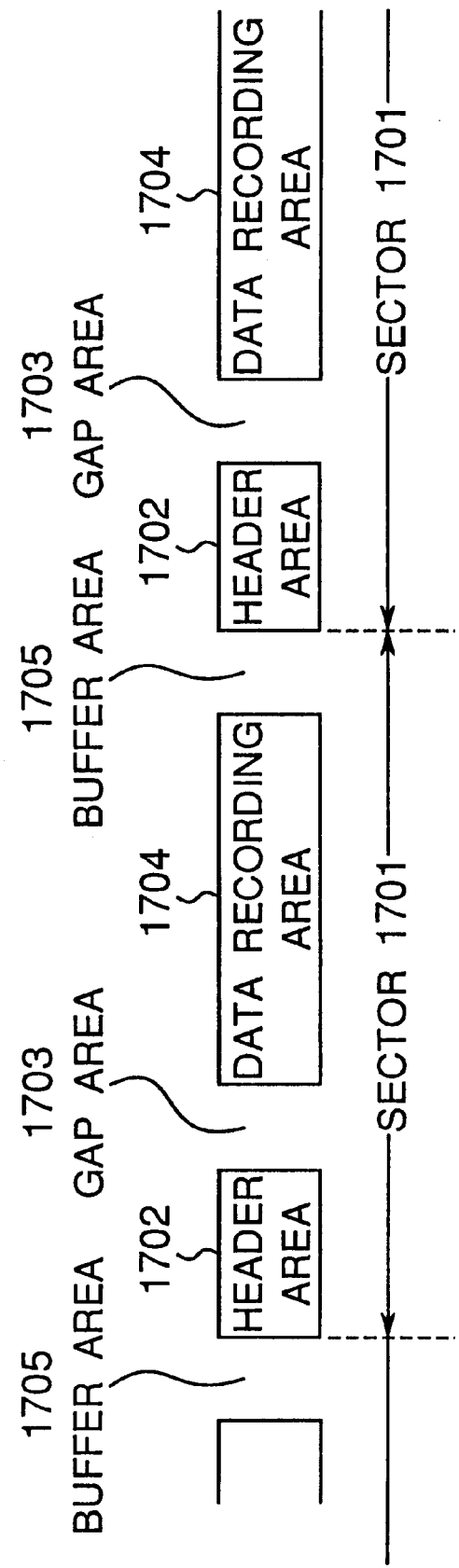
FIG. 17 is used to describe an exemplary sector structure for a rewritable optical disc.

As also noted above, each sector on a rewritable optical disc typically has blank areas where no data is recorded. As described above with reference to FIG. 17, these include the gap 1703, buffer area 1705, and the data recording area 1704 of unrecorded sectors. Because the read clock is derived by phase locking with the digitized reproduction signal as described above, phase locking is, in principle, not possible when the laser spot is focused in an area where there is no data (a "blank area" below). When traversing a blank area, PLL circuit 202 operation is normally phase locked to the reference clock, or held the frequency immediately before the blank area is entered. It is therefore not possible to track variations in linear velocity, for example, when traversing a blank area, and a certain error is thus introduced to the read clock frequency.

Read clock precision also depends upon the quality of the reproduction signal. If the reproduction signal is degraded by disc defects, for example, read clock jitter increases, and phase synchronization of the PLL circuit 202 may not be possible.

As a result of the above factors, counter output from the first sector counter 205 cannot accurately express the current position in a sector when read clock precision is degraded.

Counter output from the second sector counter 206, on the other hand, is derived from the reference clock, and error relative to absolute time is therefore within the limits of quartz oscillator and frequency synthesizer precision. Error is therefore small enough to be effectively ignored. Counter output in this case is also not dependent on the quality of the reproduction signal, and counter output is therefore not affected by disc defects, for example.

However, the angular velocity of the disc deviates from the reference during or immediately after the optical head 103 moves radially to the disc for an address search operation with CLV, ZCLV, and other control methods whereby angular velocity varies with the radial position of the disc. As a result, counter output from the second sector counter 206 differs from the actual sector position.

Furthermore, when the reference clock frequency differs between zones as it does with ZCAV control media, the relationship between zone and reference clock frequency can deviate as a result of address searching between zones and when the optical disc drive starts up. As a result, counter output from the second sector counter 206 also differs from the actual sector position in this case.

A circuit enabling consistently precise representation of the sector position considering the relationship between actual sector positions and sector positions represented by counter output from a first sector counter 205 using a read clock, and counter output from a second sector counter 206 using a reference clock, is described next below.

Figure 8:
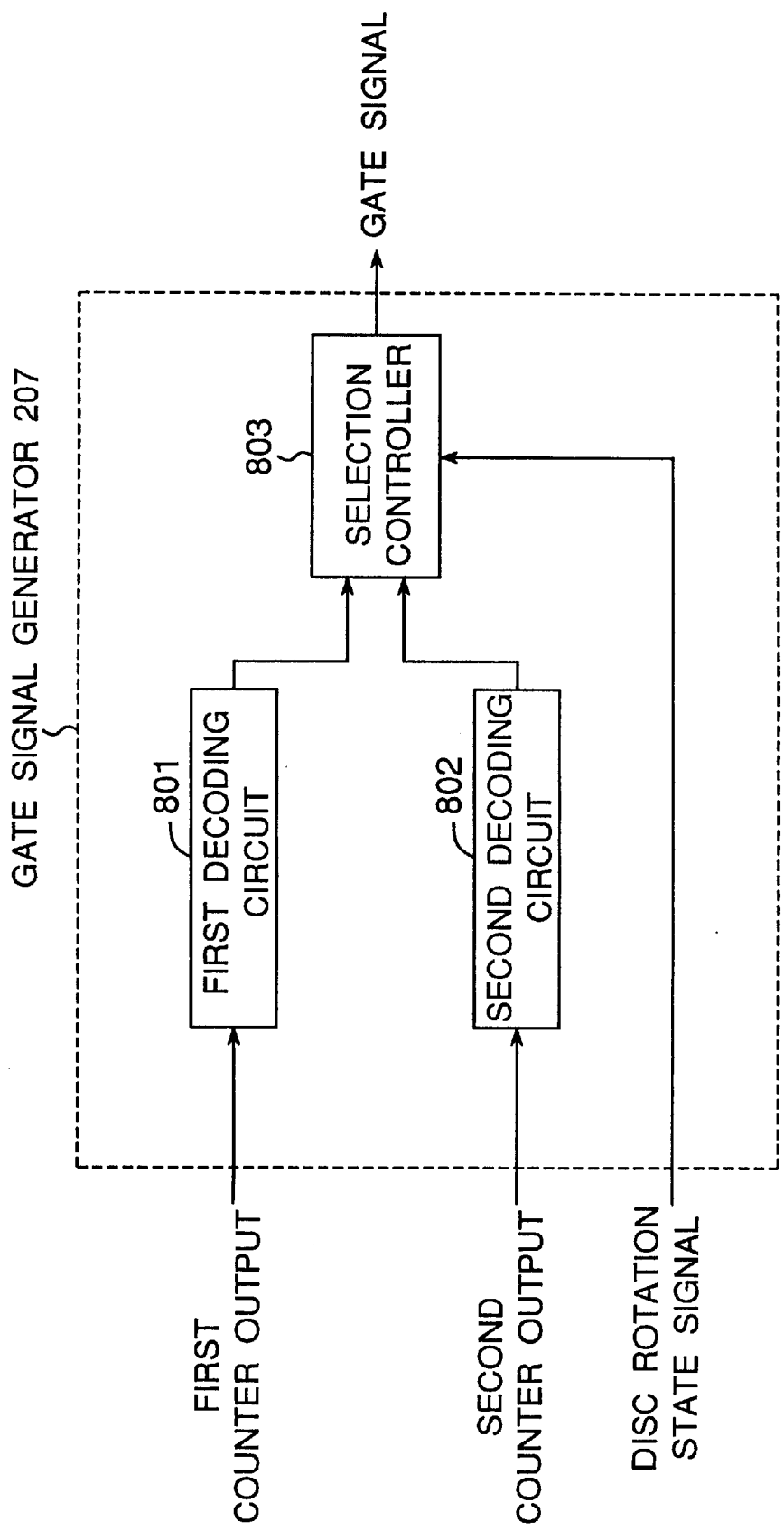
FIG. 8 is a block diagram showing an internal configuration of a gate signal generating circuit 207 in the timing signal generator 111 shown in FIG. 2 according to a first embodiment of the present invention.

FIG. 8 is a block diagram showing an internal configuration of a gate signal generating circuit 207 in the timing signal generator 111 shown in FIG. 2 according to a first embodiment of the present invention.

The gate signal generating circuit 207 shown in FIG. 8 outputs a read gate for controlling PLL operation or digitizing by the reproduction signal processor 106 shown in FIG. 1.

Figure 13A:
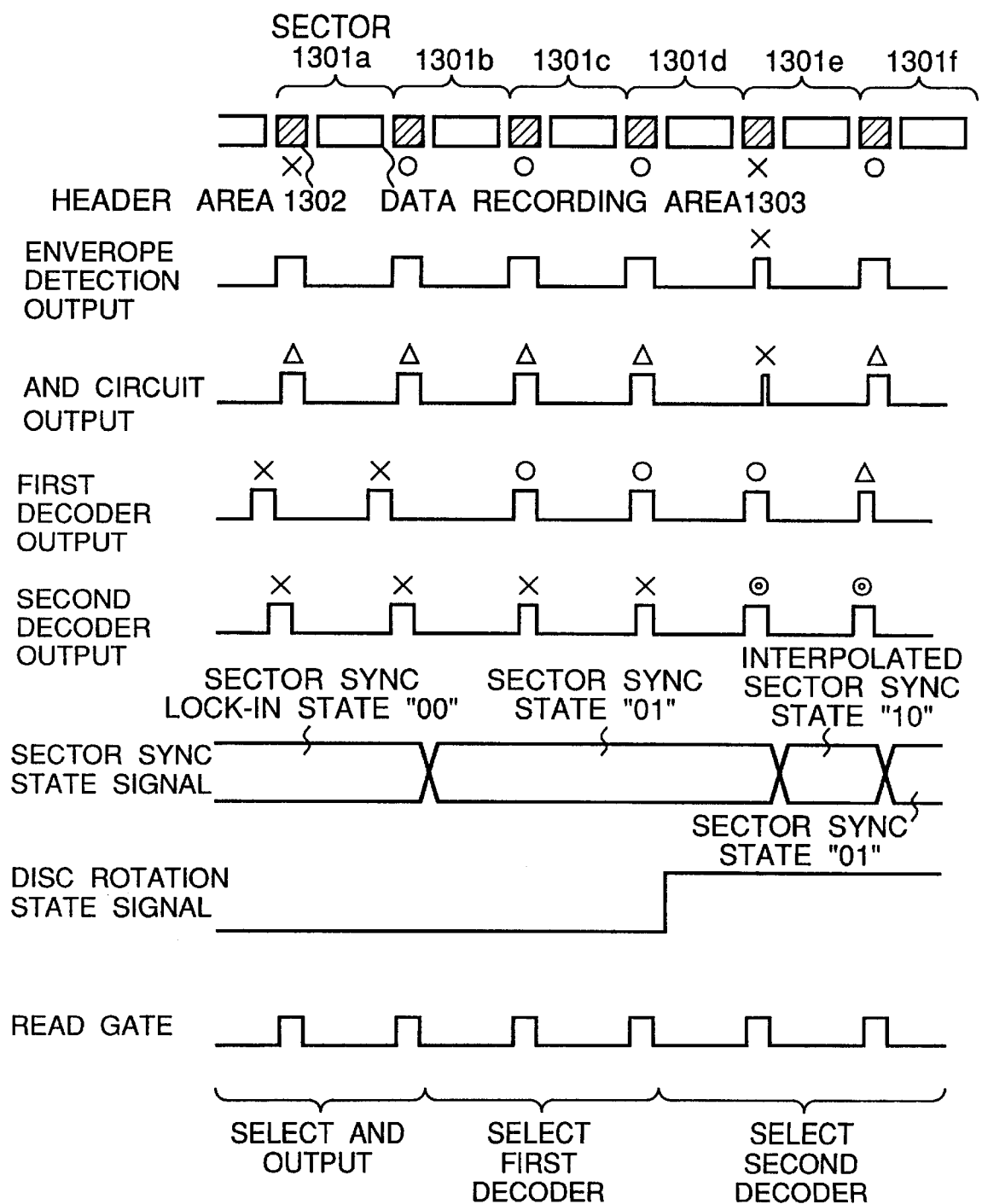
FIG. 13 is a timing diagram used to describe the operation of the selection control means 1003 in a gate signal generating circuit 502 shown in FIG. 10 according to the fourth embodiment of the present invention.
Figure 13B:
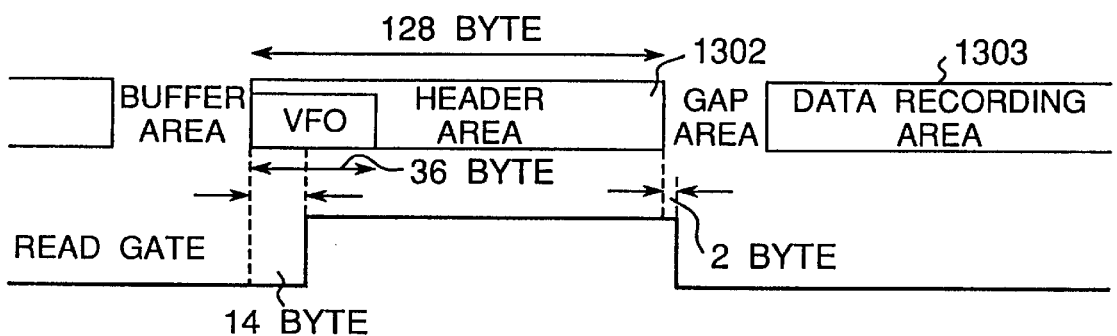

Referring to FIG. 13(B), a timing chart of the read gate for controlling the PLL operation by the PLL circuit 202 and the digitizing operation by the signal digitizer 201 is shown.

Header area 1302 has a total length of 128 bytes with 36 byte long VFO pattern inserted in the front. What follows after the VFO pattern are an address mark representing the leading portion of the address information, and an address information data coded according to a predetermined coding rule. The VFO pattern is, for example, a repetition of 4T mark and 4T space alternately, and is used for obtaining rapid lock-in state of the PLL for the reproduction of data and clock from the reproduced signal.

The signal digitizer 201 first rapidly carries out the slicing level adjusting operation by the internally provided slice level adjusting circuit during the reading of the VFO pattern until the slicing level is appropriately adjusted. After reading the VFO pattern, the the signal digitizer 201 moderately carries out the slicing level adjusting operation by the internally provided slice level adjusting circuit during the reading of the address mark and the address information data. The switching between rapid and moderate adjusting operations of the slicing level is done by changing the time constant value of the circuit through a suitable control signal which is obtained from the read gate. When the read gate is in the LOW level, the slice level adjustment is carried out rapidly, and when the read gate is in the HIGH level, the slice level adjustment is carried out moderately.

To obtain the rapid and stable synchronization of the reproduced signal, it is preferable to start the lock-in operation of the digitized data to be in synchronized state with the PLL circuit, as soon as possible from the time point at which the slicing level is completely adjusted to the VFO pattern by the signal digitizer 201. In other words, unless the slicing level is properly adjusted to the reproduced signal to produce appropriate binary signals, the phase comparison with the binary data will not be carried out, and therefore, the phase synchronization of the binary date will not be carried out. Thus, the read gate is used for controlling the PLL operation. The PLL operation is controlled to be in phase synchronization with the binary data only when the read gate is in HIGH level.

As explained above, in order to read the address information data in the header area 1302, it is necessary to use the 36 bytes of VFO pattern for both the slice level adjustment and the PLL lock-in operation in time sharing manner. According to one example, a minimum length data of the VFO pattern necessary for the slice level adjustment is 12 bytes. This minimum length data can be calculated by using the one cycle period of the data one channel bit, an amplitude of the reproduced signal applied to signal digitizer 201, and a time constant of the circuit during the rapid slice level adjustment. Also in the same example, the minimum length data of the VFO pattern necessary for the PLL lock-in operation is 20 bytes. This minimum length data can be calculated by using the one cycle period of the data one channel bit and the loop gain of the PLL.

Therefore, according to the above example, the rise-up timing of the read gate in the header area 1302 should be after 12 bytes from the leading edge of the header area 1302 so as to obtain enough bytes for the slice level adjustment. Also, to obtain enough bytes for the PLL lock-in operation, it is necessary to have more than 20 bytes from the rise-up timing to the end of the VFO pattern, that is the rise-up timing of the read gate in the header area 1302 should be before 16 bytes from the leading edge of the header area 1302.

Also, the rise-down timing of the read gate should be after the end of the header area 1302 so that the address information data in the header area 1302 can be completely in the phase synchronized state in the PLL circuit.

Also, after the end of the header area 1302, since there will be no binary data necessary for the PLL phase synchronization, the read gate immediately becomes HIGH to prevent the phase synchronization.

In the example shown in FIG. 13(B), the rise-up timing of the read gate in the header area 1302 is selected at 14 bytes from the leading edge of the header area 1302 so that enough bytes are reserved for the slice level adjustment and for the PLL lock-in operation. Also, the rise-down timing of the read gate is selected at 2 bytes after the trailing edge of the header area 1302. Therefore, the rise-up timing of the read gate can have an allowed deviation error of ±2 bytes, and also the rise-down timing of the read gate can have an allowed deviation error of ±2 bytes.

Referring to FIG. 8, a first decoding circuit 801 decodes the counter output of the first sector counter 205, and outputs a high digital signal when counter output is within a specific value range, for example. A second decoding circuit 802 similarly decodes the second sector counter 206 output, outputs a digital signal.

A selection controller 803 selects the output of either first decoding circuit 801 or second decoding circuit 802, and passes the selected signal as the output read gate. This signal selection is based on a disc rotation state signal supplied from the servo 105 (see FIG. 1). The disc rotation state signal is a digital signal indicative of the rotation of disc motor 102, and is high when the optical disc 101 is spinning at a specific speed. The specific speed may be a predetermined speed or a predetermined range of speed.

Whether the optical disc 101 is spinning at the specified speed is determined by measuring the period of an FG pulse output from the disc motor, and determining whether the measured period is within a specific range. When the disc rotation state signal is low, the selection controller 803 selects the output from first decoding circuit 801; when high, it selects the output from second decoding circuit 802.

As a result, read gate signal timing is based on the read clock when the disc is not spinning at a specific speed (when the disc rotation state signal is low). A gate signal with good timing precision can therefore be output even if the disc speed deviates from the specified disc speed insofar as the read clock frequency substantially matches the reproduced data.

When the disc is spinning at a specific speed (when the disc rotation state signal is high), the read gate signal timing is based on the reference clock. A gate signal with good timing precision can therefore be output without being affected by signal quality when the disc speed is correct.

Figure 3:
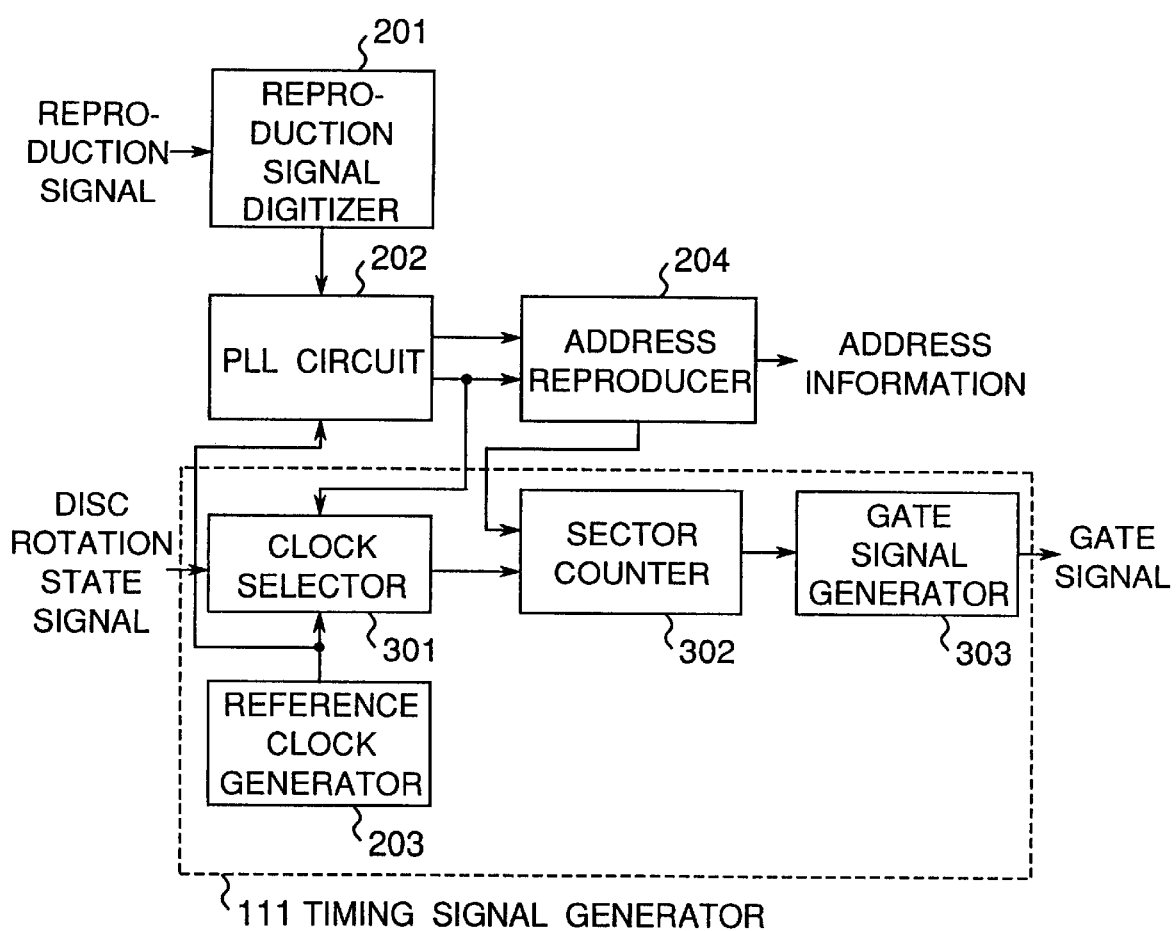
FIG. 3 is a block diagram of a timing signal generator 111 and surrounding components according to a second embodiment of the present invention.

FIG. 3 is a block diagram of a timing signal generator 111 and surrounding components according to a second embodiment of the present invention.

It should be noted that the function of the reproduction signal digitizer 201, PLL circuit 202, reference clock generator 203, and address reproducer 204 shown in FIG. 3 are the same as in the first embodiment shown in FIG. 2 above, and further description thereof is thus omitted below.

Referring to FIG. 3, a clock selector 301 selects either the read clock output from the PLL circuit 202, or the reference clock output from the reference clock generator 203, and outputs the selected clock to a sector counter 302. Signal selection by the clock selector 301 is determined according to the disc rotation state signal output from the servo 105 (FIG. 1). That is, when the disc rotation state signal Is low, the clock selector 301 selects the read clock; when high, it selects the reference clock.

The sector counter 302 counts the length of one sector using the clock selected by the clock selector 301. As described above with reference to FIG. 2, for example, if the length of one sector is 2697 bytes, and 1 byte equals 16 channel bits, the clock selector 301 can be 16-bit loop counter that counts from 0 to 43,151 (=2697×16−1), and then resets to 0. Sector length can also be expressed as the bit or byte position count from a specific sector address position by presetting the counter to a specific value using the address detection signal timing of the address reproducer 204.

The gate signal generating circuit 303 generates and supplies the various gate signals for controlling the operation of other circuit blocks using the counter output from the sector counter 302.

With a timing signal generator 111 thus comprised, gate signal timing is based on the read clock when the disc is not spinning at a specific speed (when the disc rotation state signal is low). Therefore, insofar as the read clock frequency substantially matches the reproduced data, a gate signal with good timing precision can be output even if the disc speed deviates from the specified disc speed. When the disc is spinning at a specific speed (when the disc rotation state signal is high), the gate signal timing is based on the reference clock. A gate signal with good timing precision can therefore be output without being affected by signal quality when the disc speed is correct.

It should be noted that only one sector counter is needed for gate signal generation with a timing signal generator 111 comprised as shown in FIG. 3 because the read clock or reference clock is selected by the clock selector 301 and a single clock signal is passed to the sector counter. The scale of a timing signal generator 111 comprised as shown in FIG. 3 is thus smaller than that of the timing signal generator 111 shown in FIG. 2.

On the other hand, a read clock synchronized counter and a reference clock synchronized counter are both supplied to the gate signal generating circuit 207 of the timing signal generator 111 shown in FIG. 2. As a result, not only it is possible to generate a single gate signal using both counter outputs as shown in FIG. 8 and described above, it is also possible to generate one gate signal using only the read clock synchronized counter output, and generate a separate gate signal using only the reference clock synchronized counter output. As a result, the timing signal generator 111 shown in FIG. 2 offers greater utility in gate signal generation than does the timing signal generator 111 shown in FIG. 3.

Figure 4:
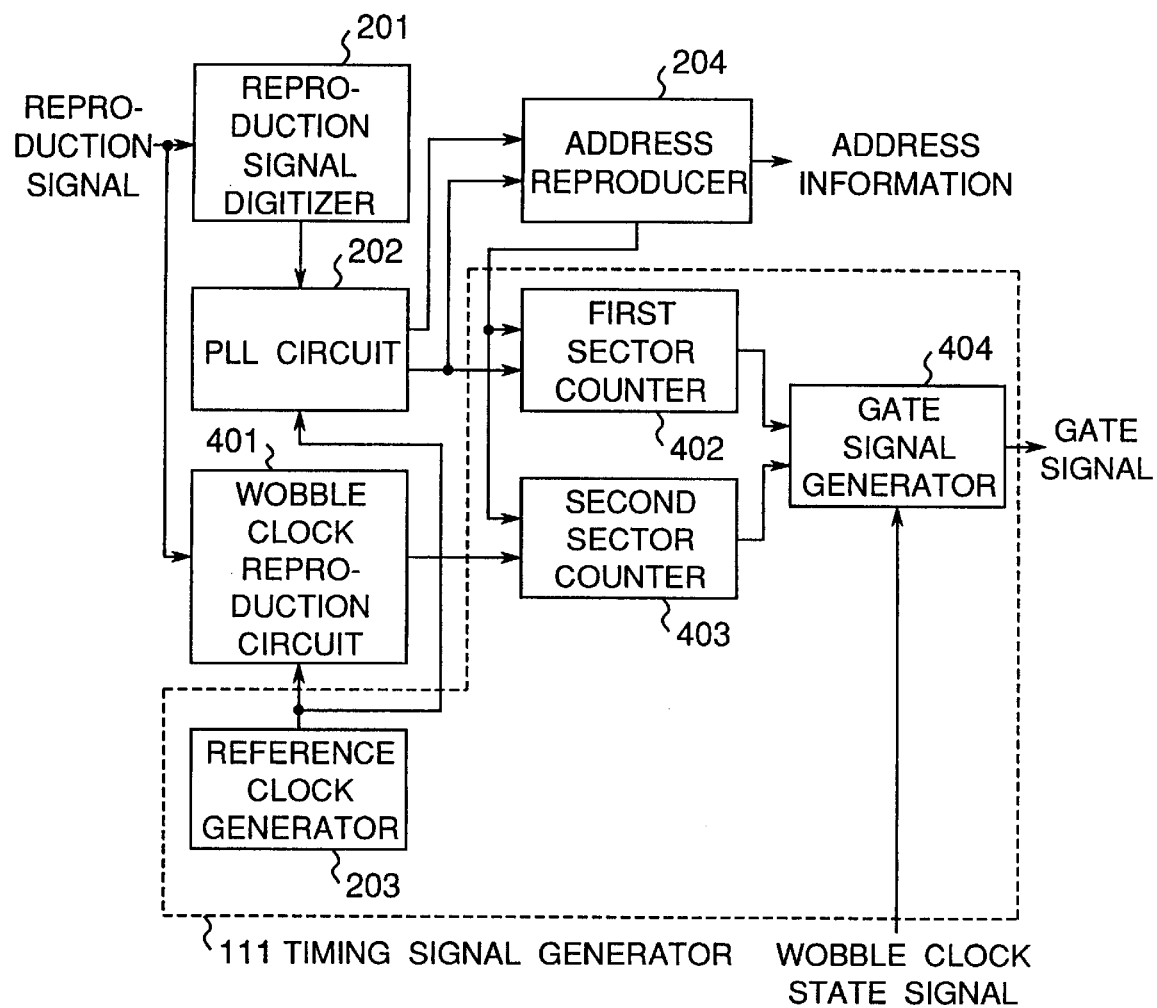
FIG. 4 is a block diagram of a timing signal generator 111 and surrounding components according to a third embodiment of the present invention.

FIG. 4 is a block diagram of a timing signal generator 111 and surrounding components according to a third embodiment of the present invention, which is particularly suitable for use in an optical disc drive for recording and reproducing optical discs having a wobble groove as described above.

It should be further noted that the function of the reproduction signal digitizer 201, PLL circuit 202, reference clock generator 203, and address reproducer 204 shown in FIG. 4 are the same as in the first embodiment shown in FIG. 2 above, and further description thereof is thus omitted below.

Though not shown in the figures, a wobble clock reproduction circuit 401 comprises a filter for extracting the wobble signal component from the optical disc reproduction signal; a digitizing circuit for digitizing the extracted sine wave shaped wobble signal; and a PLL for phase locking on the digitized signal and extracting a wobble clock synchronized to the wobble signal. According to one example, one sector period has 232 wobble clocks, and one wobble clock period has 186 channel bits.

A detail of the wobble clock reproduction circuit is disclosed in U.S. patent application Ser. No. 09/095,212 filed Jun. 10, 1998, which is herein enclosed by reference.

The first sector counter 402 is a circuit for counting the length of one sector using the read clock supplied from the PLL circuit 202. For example, if the length of one sector is 2697 bytes, and 1 byte equals 16 channel bits, the first sector counter 402 can be 16-bit loop counter that counts from 0 to 43,151 (=2697×16−1), and then resets to 0. Sector length can also be expressed as the bit or byte position count from a specific sector address position by presetting the counter to a specific value using the address detection signal timing of the address reproducer 204.

A second sector counter 403 is a circuit for counting the length of one sector using the wobble clock supplied from the wobble clock reproduction circuit 401. This second sector counter 403 can also be a loop counter as described above. Alternatively, sector length can be expressed, as described above, as the bit or byte position count from a specific sector address position by presetting the counter to a specific value at the address detection signal timing.

The gate signal generating circuit 404 generates and supplies the various gate signals for controlling the operation of other circuit blocks using the counter values output from the first and second sector counters 402 and 403.

The precision of the wobble clock reproduced by an internal PLL of the wobble clock reproduction circuit 401 is considered briefly below.

As described with reference to the related art above, the wobble signal period is normally sufficiently long compared with the period of the address information in the header area and user data recorded to the user data area. As a result, the phase locking speed of the wobble clock PLL is slower than that of the PLL circuit 202 for reproducing the read clock. This is because the clock phase is synchronized using the transition point (edge) information of the signal to which the PLL is applied. That is, if the period of the wobble signal is 100 times the period of the recorded data, the time required to lock in the wobble clock will be approximately 100 times the time required for the read clock based on a very simple comparison. Conversely, however, the wobble clock offers greater PLL stability when there are scratches or other disc defects. This is because, assuming a defect of a particular length, the amount of edge information damaged by the defect is relatively little compared to the period of the wobble signal, and the effect of the defect on the PLL is therefore also less.

Figure 9:
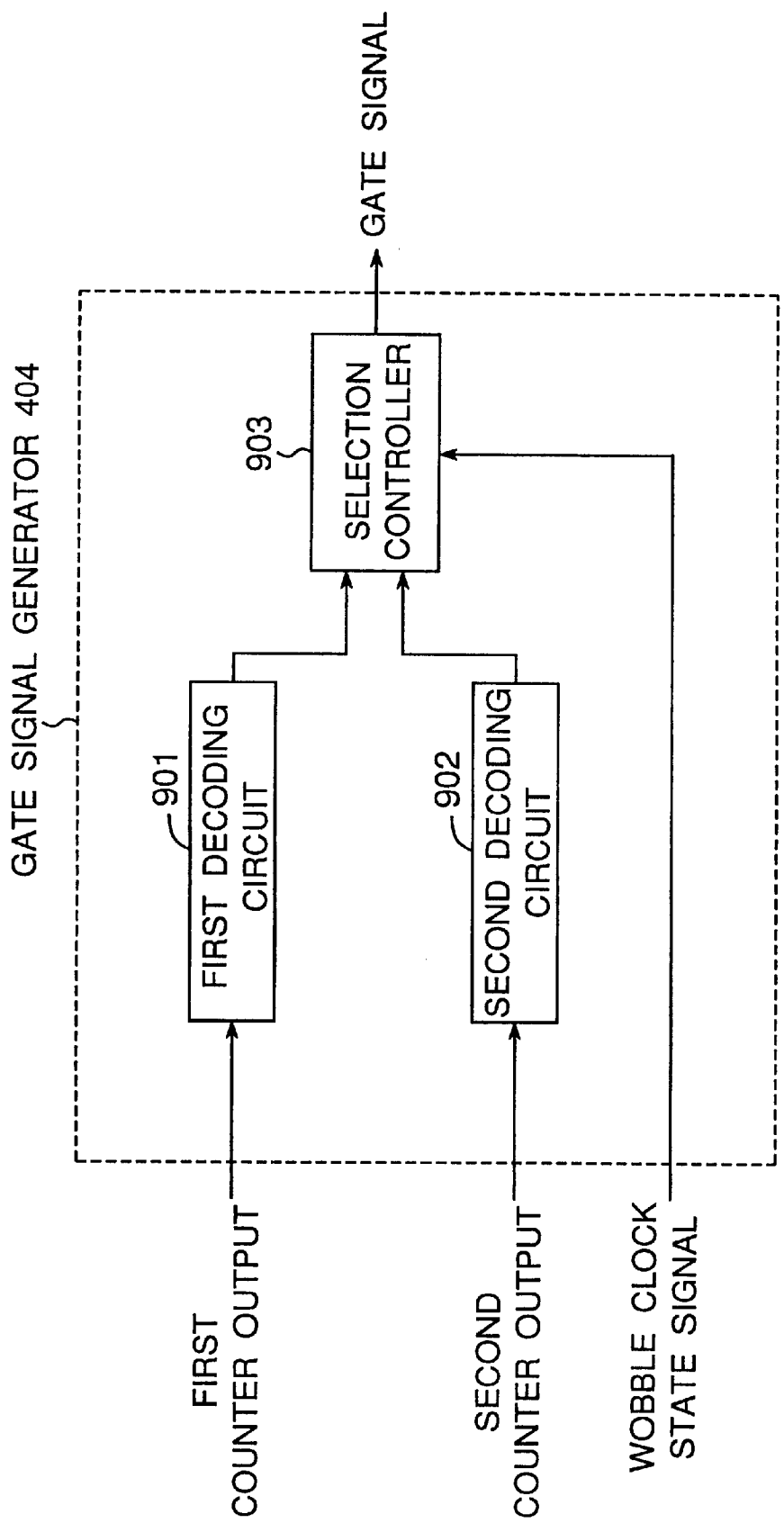
FIG. 9 is a block diagram showing an internal configuration of a gate signal generating circuit 404 in the timing signal generator 111 shown in FIG. 4 according to a third embodiment of the present invention.

FIG. 9 is a block diagram showing an internal configuration of a gate signal generating circuit 404 in the timing signal generator 111 shown in FIG. 4 according to a third embodiment of the present invention.

The gate signal generating circuit 404 shown in FIG. 9 outputs a read gate for controlling PLL operation or digitizing by the reproduction signal processor 106 shown in FIG. 1.

Referring to FIG. 9, a first decoding circuit 901 decodes the counter output of the first sector counter 402, and outputs a high digital signal when counter output is within a specific value range, for example. A second decoding circuit 902 similarly decodes the second sector counter 403 output, outputs a digital signal.

A selection controller 903 selects the output of either first decoding circuit 901 or second decoding circuit 902, and passes the selected signal as the output read gate. This signal selection is based on a wobble clock state signal supplied from the wobble clock reproduction circuit 401 (see FIG. 4). The wobble clock state signal is a digital signal indicative of the phase lock state of the PLL circuit built in to the wobble clock reproduction circuit 401, and is high when the wobble clock is phase locked to the digital wobble signal in the PLL circuit.

When the wobble clock state signal is low, the selection controller 903 selects the output of first decoding circuit 901; when high, the selection controller 903 selects the output of second decoding circuit 902.

The read gate signal timing is thus referenced to the wobble clock when the wobble clock is phase locked to the wobble signal on the disc. A gate signal with good timing precision can therefore be output even when disc defects are present because the wobble clock frequency is stable.

When the wobble clock is not phase locked, the read gate signal timing is referenced to the read clock. A gate signal with good timing precision can therefore be output even if the disc speed deviates from the specified disc speed insofar as the read clock frequency substantially matches the reproduced data when time is required for locking the wobble clock PLL, such as when seeking an address with radial movement from the inside to the outside circumference, or from the outside to the inside circumference, of the disc.

It is therefore also possible to more quickly output a gate signal with good timing precision compared with when the timing signal is always generated based on the wobble clock.

It will be obvious to one with ordinary skill in the related art that while the present embodiment has been described with reference to an exemplary configuration for generating gate signal timing required for data recording and reproducing using a wobble clock derived from a wobble groove formed on the optical disc, the method of the present embodiment can also be adapted to a sample servo method as known from the literature. That is, the same function and benefits can be achieved by replacing the wobble clock reproduction circuit 401 shown in FIG. 4 with a means for reproducing a clock from clock pits formed on the disc.

Figure 5:
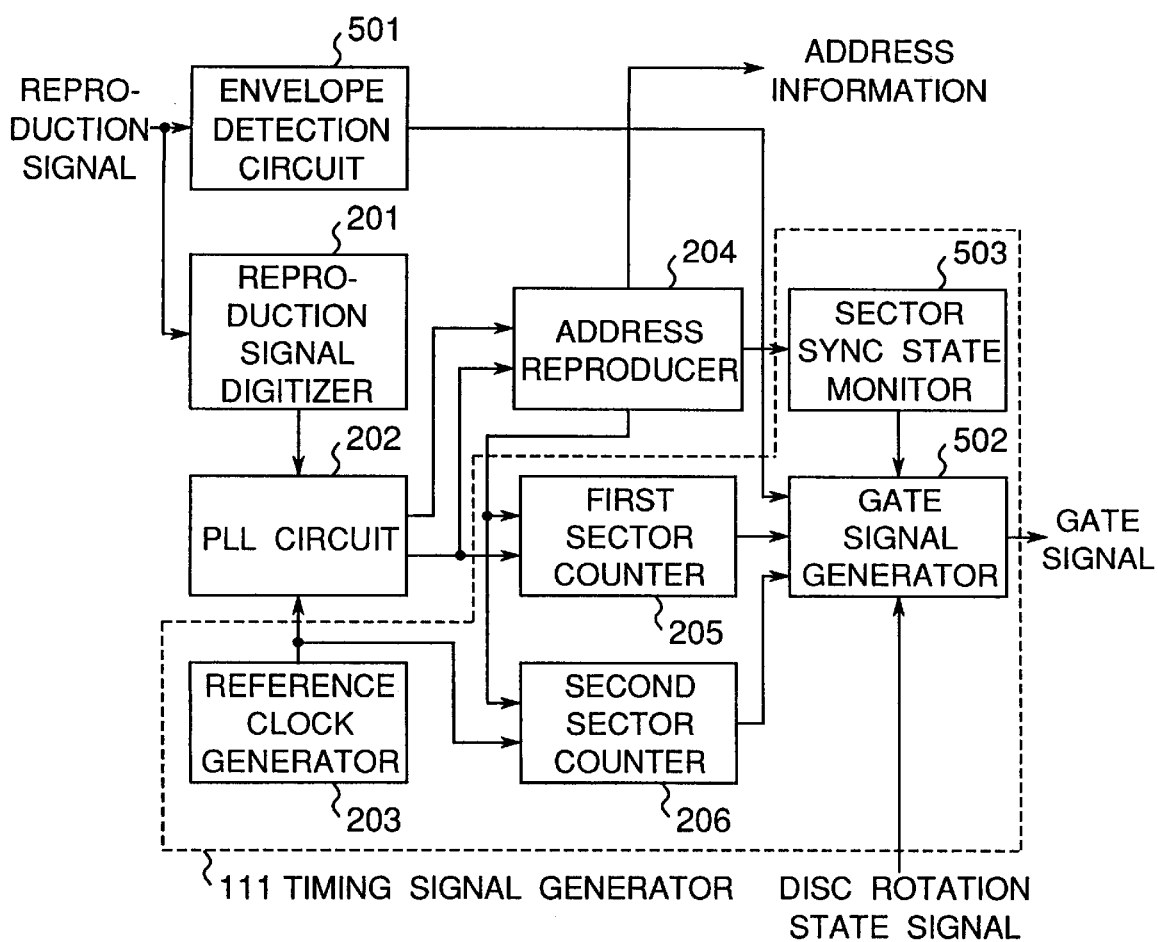
FIG. 5 is a block diagram of a timing signal generator 111 and surrounding components according to a fourth embodiment of the present invention.

FIG. 5 is a block diagram of a timing signal generator 111 and surrounding components according to a fourth embodiment of the present invention.

As understood from FIG. 5, a timing signal generator 111 according to the present embodiment is a timing signal generator 111 as shown in FIG. 2 further comprising an envelope detection circuit 501. The envelope detection output from the envelope detection circuit 501 is actively used for timing signal generation. According to one example, one envelope is detected at the beginning of each sector where the header area is located.

A detail of the envelope detection circuit is disclosed in PCT/JP97/01301 filed Oct. 23, 1997, which is published as WO 97/39444, and is herein enclosed by reference.

It should be further noted that the function of the reproduction signal digitizer 201, PLL circuit 202, reference clock generator 203, and address reproducer 204 shown in FIG. 5 are the same as in the first embodiment shown in FIG. 2 above, and further description thereof is thus omitted below.

An exemplary envelope detection circuit 501 comprises an envelope detector for outputting an envelope detection signal that goes high when the RF amplitude of the reproduction signal equals or exceeds a specified level. The output envelope detection signal, which is synchronized to the header area, is supplied to a gate signal generating circuit 502.

This gate signal generating circuit 502 generates and supplies the various gate signals for controlling the operation of other circuit blocks using the counter output from the first sector counter 205 (read clock synchronized), the counter output from second sector counter 206 (reference clock synchronized), and the envelope detection signal.

A sector synchronization state monitor 503 monitors the sector synchronization state in the current sector using the address detection signal from the address reproducer 204, and outputs a sector synchronization state signal to the gate signal generating circuit 502.

This sector synchronization state indicates the address error state in the current sector and a specified number of sectors immediately preceding the current sector. The following four sector synchronization states are used in the present embodiment.

(1) Normal sector synchronization state

A normal sector synchronization state is indicated when the address detection signal is output in the current sector.

In this state the first and second sector counters 205 and 206 are preset based on the address detection signal in the current sector. As a result, the counter outputs express a bit position or byte position with good precision based on the address location of the current sector.

(2) Interpolated sector synchronization state

An interpolated sector synchronization state is indicated when the address detection signal was not output in the current sector, but was output at least once within a specific number of sectors before the current sector. The specific number of sectors may be several to several thousand sectors, depending on the reliability of various timing signals and the degree of tolerance of the signals from the read gate.

In this state the first and second sector counters 205 and 206 are not preset based on an address detection signal within a specific number of sectors before the current sector. As a result, it is possible that counter output is offset from the actual bit or byte position referenced to the address location of the current sector. However, if the disc speed matches a specified disc speed, the error between the second sector counter 206 output, which is synchronized to the reference clock, and the bit or byte position on disc is not great. However, error resulting from variation in the linear velocity caused by deviation from the specified disc speed and disc eccentricity, for example, will occur.

(3) Sector synchronization lock-in state

A sector synchronization lock-in state is indicated when the address detection signal is not output in the current sector or within a specific number of sectors before the current sector.

In this state the first and second sector counters 205 and 206 have not preset based on an address detection signal for a specific number of sectors. As a result, it is possible that counter output is significantly offset from the actual bit or byte position referenced to the address location of the current sector.

(4) Sector synchronization stopped state

A sector synchronization stopped state is indicated when address reproduction by the address reproducer 204 has stopped. This state occurs at least when disc recording and reproducing are stopped and the disc is not spinning, such as when a user implements a disc replacement command, and in the period between when the power is turned on (or a hardware reset occurs) and a disc address is read.

These four states are discriminated based on the sector synchronization state signal output by the sector synchronization state monitor 503, thereby enabling other circuit blocks to determine the sector synchronization state based on this sector synchronization state signal.

The sector synchronization state monitor 503 is a four-state state machine, and the sector synchronization state signal can be expressed using, for example, a 2-bit digital signal. It should be noted that this state machine can be a digital circuit using flip-flops, or a software construction implemented in microcode executed by the system controller 110 or format encoder/decoder 107.

Figure 12:
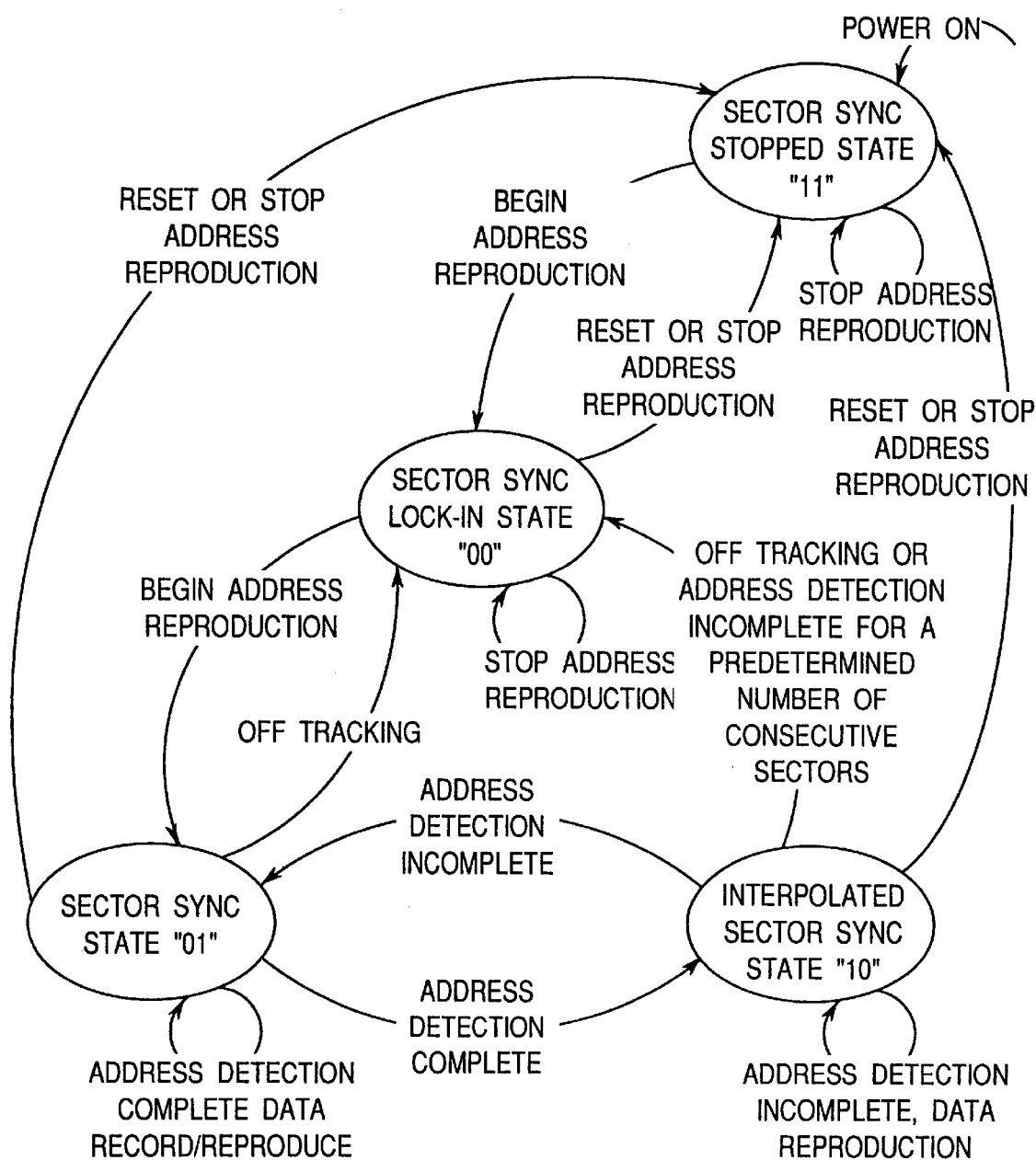
FIG. 12 is a state transition diagram used to describe transitions between sector synchronization states in the fourth embodiment of the present invention.

FIG. 12 is a state transition diagram used below to describe sector synchronization state transitions in the present embodiment with specific reference to transitions between the above-noted four states.

A sector synchronization stopped state is selected when the power is turned on. The sector synchronization state monitor 503 outputs a "11" sector synchronization state signal in the sector synchronization stopped state. The sector synchronization stopped state is held until address reproduction begins (that is, until the system controller 110 instructs the format encoder/decoder 107 to begin address reproduction).

A sector synchronization lock-in state is entered when address reproduction begins. The sector synchronization state monitor 503 outputs a "00" sector synchronization state signal in the sector synchronization lock-in state. The gate signal generating circuit 502 in the timing signal generator 111 outputs a read gate enabling address reproduction to the reproduction signal digitizer 201 and PLL circuit 202 of the reproduction signal processor 106. The address reproducer 204 thus detects and reproduces an address using the read data and read clock output from the PLL circuit 202, and outputs an address detection signal. Note that data recording and reproducing do not occur in this sector synchronization lock-in state.

When address information is reproduced in a particular sector with an error level below a specified level, and an address detection signal is output, the normal sector synchronization state is entered. In this normal sector synchronization state, the sector synchronization state monitor 503 outputs a "01" sector synchronization state signal. Data recording and reproducing are possible in this state. The gate signal generating circuit 502 of the timing signal generator 111 outputs a read gate to the reproduction signal digitizer 201 and PLL circuit 202 for address reproduction and, as required, data reproduction. When data recording is desired, the gate signal generating circuit 502 outputs a write gate signal to the laser driver 108. This normal sector synchronization state is held as long as the optical head is tracking correctly, and the address detection signal continues to be output.

If tracking is disrupted as a result of seeking a new address, or the optical head deviates from the normal tracking position of the current track, the sector synchronization lock-in state is resumed. This is because data recording and reproducing are not possible when tracking is off, and when tracking is resumed, it is necessary to quickly resume address reproduction.

In addition, if address detection fails in some sector, or the number of errors in the detected address information exceeds some predefined threshold, when in the normal sector synchronization state, the interpolated sector synchronization state is entered. The sector synchronization state monitor 503 outputs a "10" sector synchronization state signal in the interpolated sector synchronization state. Furthermore, if tracking is switched off or address errors exceeding some threshold occur in a specific number of continuous sectors, the sector synchronization lock-in state is assumed.

This specified number of sectors is predefined based on errors occurring at the sector position of the gate signal output in the interpolated sector synchronization state. That is, the error (difference) between the actual bit position in the sector and the output of first sector counter 205 (or second sector counter 206) occurring in one sector when address information is continuously not detected is defined as error e1. In other words, error e1 is the difference between the actual position and the counted position. The allowable error for a particular gate signal is defined as error e2, and the specific number of sectors is n. If n is then defined such that $$e1 \times n < e2,$$

the timing error of a particular gate signal will be within an allowable range even if the interpolated sector synchronization state continues for n sectors. Data recording and reproducing are therefore possible in this state by interpolating sector synchronization.

However, particular care is required for data recording because errors are present in the address information in sectors in which the interpolated sector synchronization state is set. More specifically, errors in the address information mean that data reproduction may not be sufficiently reliable. This means that, for example, if the optical disc and drive are used for data storage with a computer, some means of moving data from the sector with errors to a sector where reliable data reproduction is possible is preferably implemented as soon as possible. This can be accomplished, for example, by replacement of sectors where errors occur by registering them as defective sectors where data recording is prevented, and recording the data to a different, error-free sectors.

If the interpolated sector synchronization state is set during data reproduction, this mode is used because it is necessary to reproduce user data recorded to the data recording area. More specifically, stable data reproduction is possible even if there are errors in the address information insofar as the gate signal timing error is within a specific limited range.

Figure 10:
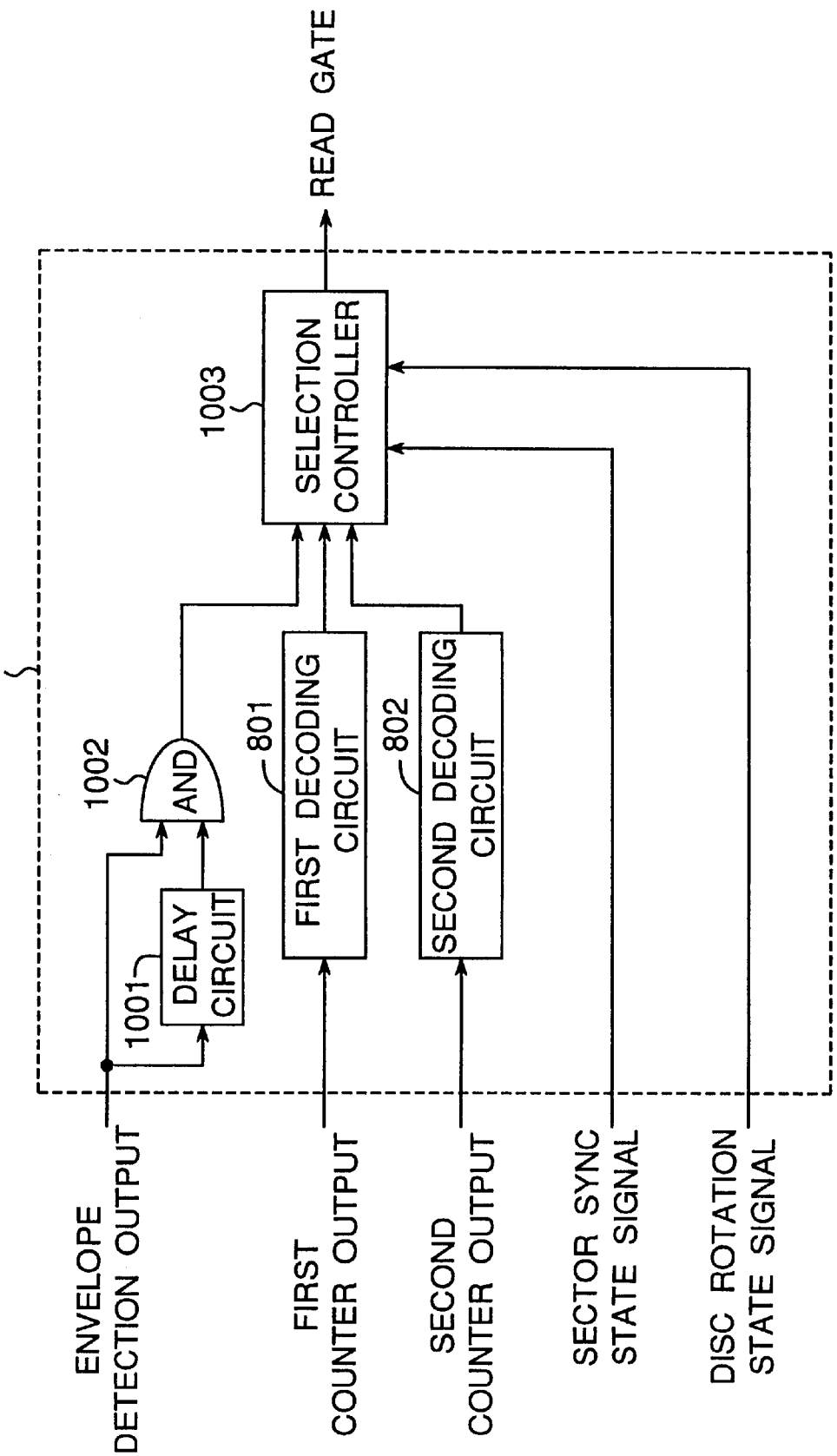
FIG. 10 is a block diagram showing an internal configuration of a gate signal generating circuit 502 in the timing signal generator 111 shown in FIG. 5 according to a fourth embodiment of the present invention.

FIG. 10 is a block diagram showing an internal configuration of a gate signal generating circuit 502 in the timing signal generator 111 shown in FIG. 5 according to a fourth embodiment of the present invention. A gate signal generating circuit 502 according to this preferred embodiment outputs a read gate for controlling digitizing and PLL operation in the reproduction signal processor 106 shown in FIG. 1. It should be noted that the first decoding circuit 801 and second decoding circuit 802 shown in FIG. 10 have the same operation and function as those shown in FIG. 8, and further description thereof is thus omitted below.

Referring to FIG. 10, a delay circuit 1001 delays the envelope detection output from envelope detection circuit 501 for a predefined period. This delay circuit 1001 can be a digital circuit construction such as a shift register or counter for delaying envelope detection output a specific clock count, or it can be an analog circuit construction such as an analog delay for delaying envelope detection output a specific time by analog means.

AND circuit 1002 obtains the logical AND of the envelope detection output and the delayed output from the delay circuit 1001.

The selection controller 1003 selects the output from AND circuit 1002, first decoding circuit 801, and second decoding circuit 802 on a time-share basis using the disc rotation state signal from the servo 105 and the sector synchronization state signal from the sector synchronization state monitor 503 to output the read gate.

FIG. 13 is a timing diagram used to describe the operation of the selection control means 1003 in a gate signal generating circuit 502 shown in FIG. 10 according to the fourth embodiment of the present invention.

Using time signal waveforms, FIG. 13(A) shows read gate generation from when tracking is on until the address information is read and sector synchronization can be held normally. Note that time progresses from left to right, and it is assumed below that the sector synchronization lock-in state is set at the first (left-most) of the six continuous sectors shown in FIG. 13.

FIG. 13(B) shows the ideal timing of a read gate in the header area 1302 with the rising edge (where the signal goes high from low) of the read gate occurring at a specific number of bytes from the beginning of the header area 1302. If sector marks are recorded at the beginning of the header area 1302, this specific number of bytes is at least the number of bytes equivalent to the sector mark length; if a sector mark is not recorded and the sector starts with a VFO pattern, this specific number of bytes is equivalent to the time required for the reproduction signal digitizer 201 to reliably adjust the digital slicing level to the VFO pattern.

The top row in FIG. 13(A) shows six successive sectors on a disc. The sectors are sequentially labelled 1301a to 1301f, and each sector includes a header area 1302 (indicated by shading), and a data recording area 1303 (indicated by a white box). The "o" and "x" symbols below the header area 1302 of each sector indicate whether address information can be read from the corresponding header area 1302 without errors. A "o" symbol indicates error-free address reading; a "x" indicates errors are present in the address information.

The envelope detection output shown in the second row represents the waveform of the envelope detection input to the delay circuit 1001 and AND circuit 1002 in FIG. 10. Note that the envelope detection output is high in the header area 1302 of each sector from 1301a to 1301f. The envelope detection output remains low for part of header area 1302 in sector 1301e, however, because of an error in that header area 1302.

The AND circuit output wave represents the output waveform of the AND circuit 1002 in FIG. 10. The rising edge (the low to high transition) of the AND circuit output is delayed a specific time from the rising edge of the envelope detection output, and AND circuit output therefore remains high for a shorter period. The delay to the rising edge of the AND output is the time equivalent to the specific number of bytes (14 bytes) described above with reference to FIG. 13(B). Note, however, that because of the error in header area 1302 of sector 1301e, AND circuit output does not go high within this delay.

The first decoder output represents the output from the first decoding circuit 801 in FIG. 10. As described with reference to FIG. 8, the first decoding circuit 801 decodes the read clock synchronized output of the first counter such that the first decoder output goes high when the output from the first counter indicates a specific byte position. Because the first counter is synchronized to the timing at which address information can be correctly detected, a high first decoder output is probably offset from the correct byte position in a sector where address information cannot be detected.

The second decoder output represents the output from the second decoding circuit 802 in FIG. 10. As described with reference to FIG. 8, the second decoding circuit 802 decodes the reference clock synchronized output of the second counter such that the second decoder output goes high when the output from the second counter indicates a specific byte position. Like the first counter, the second counter is also synchronized to a timing at which address information can be correctly detected, and a high second decoder output is probably offset from the correct byte position in a sector where address information cannot be detected. However, when the disc speed is within a specific range, that is, when the disc rotation state signal is high, and address information is correctly detected in some sector, address information detection can fail in a following sector and the high period will still not deviate significantly from the specified position for a specific number of sectors.

The sector synchronization state signal is the signal input to the selection control means 1003 in FIG. 10. As described above, the sector synchronization state signal is "00" to indicate the sector synchronization lock-in state until the address information is first detected after tracking is on. When the address information is then detected in sector 1301*b*, the state signal goes "01" indicating a normal sector synchronization state. Address information continues to be correctly detected in the following sectors 1301*c* and 1301*d*, and the state signal therefore remains "01" to hold the normal sector synchronization state. When address information detection fails in sector 1301*e*, however, the state signal goes to "10", indicating an interpolated sector synchronization state is set. When address information is then correctly detected in sector 1301*f*, the state signal returns to "01", indicating that a normal sector synchronization state is reset.

The disc rotation state signal is the signal input to selection control means 1003 in FIG. 10. The disc rotation state signal is shown low from when tracking is on until part way into sector 1301*d*, and then goes high. A low disc rotation state signal indicates that the disk speed is changing due to a seek operation. The signal going high somewhere in sector 1301*d* indicates that the disc speed has stabilized to within a specified range.

The read gate represents the output from the selection control means 1003 in FIG. 10. It should be noted that the read gate is active (high) only in the header area of each sector shown in FIG. 13 because the only header area address information is reproduced, and user data is not reproduced from the data recording area of each sector in this example.

The read gate is time-share switched as shown in the figure between the AND circuit output, first decoder output, and second decoder output. While passing the header area of sectors 1301*a* and 1301*b*, the AND circuit output is passed as the read gate because the sector synchronization lock-in state is set. In the header area of sectors 1301*c* and 1301*d*, the normal sector synchronization state is set and the disc rotation state signal is low; the first decoder output is therefore selected as the read gate. In the header area of sectors 1301*e* and 1301*f*, the normal sector synchronization state and interpolated sector synchronization state are respectively set, but the disc rotation state signal is high; the second decoder output is therefore selected as the read gate.

The read gate selection logic based on the sector synchronization state signal and disc rotation state signal states is shown in truth table 1 and described below.

TABLE 1

| Sector Sync State Signal | Disc Rotation State Signal | Read Gate Selection |
| --- | --- | --- |
| Normal State | L Level | 1st Decoder Output |
| "01" | H Level | 2nd Decoder Output |
| Interpolated State | L Level | AND Output |
| "10" | H Level | 2nd Decoder Output |
| Lock-in State | L Level | AND Output |
| "00" | H Level | |
| Stopped State | L Level | L Level Fixed |
| "11" | H Level | |

First, when the address information can be read normally and the normal sector synchronization state is thus set, read gate output is based on the output of the first sector counter 205, which is synchronized to the read clock, if the disc speed is not within a specific range; if the disc speed is within this range, read gate output is based on the output of the second sector counter 206, synchronized to the reference clock.

If the address information could not be read in the previous sector, but was read correctly within a specific number of preceding sectors (the interpolated sector synchronization state is set), read gate output is based on the envelope of the reproduction signal if the disc speed is not within a specific range; if the disc speed is within this range, read gate output is based on the output of the second sector counter 206, synchronized to the reference clock.

If the address information cannot be read from a specific number of consecutive sectors, and the bit or byte position in a sector cannot be accurately indicated by the output of either first sector counter 205 or second sector counter 206 (the sector synchronization lock-in state is set), read gate output is based on the envelope of the reproduction signal.

It is therefore possible to set the read gate timing based on a reference enabling the location in a particular sector to be most accurately expressed under all operating conditions. Address reproduction can therefore be completed reliably at high speed.

It should be noted that when it is not necessary to read address information, such as in the sector synchronization stopped state, the read gate is fixed inactive (low), that is, the read gate does not go active (high in the present embodiment). The data reproduction operation of other circuit blocks, particularly the reproduction signal digitizer 201 and PLL circuit 202, can therefore be stopped, and unnecessary power consumption can be reduced.

It will also be obvious that while the present embodiment has been described with reference to a method for generating read gate timing in the header area for address reproduction, it can also be used for determining read gate timing to reproduce data from the user data area. It can also be used to determine the timing for any other gate signal where the gate signal level changes according to the sector byte position.

In addition, the selection control means 1003 can be achieved using a digital logic circuit implementing the logic shown in truth table 1. It can also be a software construction implemented as a microcode program in the format encoder/decoder.

Figure 6:
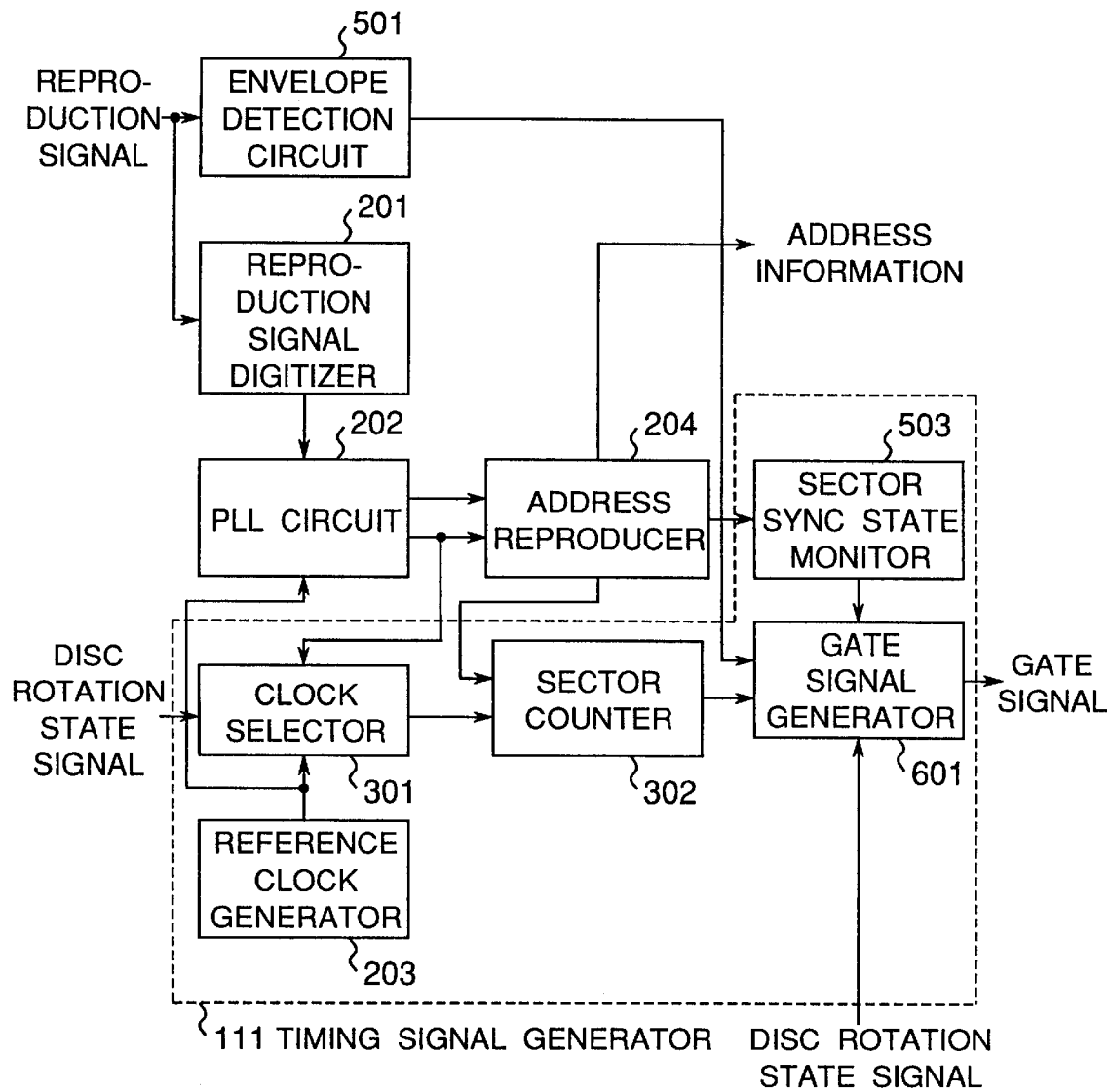
FIG. 6 is a block diagram of a timing signal generator 111 and surrounding components according to a fifth embodiment of the present invention.

FIG. 6 is a block diagram of a timing signal generator 111 and surrounding components according to a fifth embodiment of the present invention.

Similarly to the timing signal generator 111 shown in FIG. 5 as a further development of the timing signal generator 111 shown in FIG. 2, the timing signal generator 111 shown FIG. 6 is a timing signal generator 111 as shown in FIG. 3 further comprising an envelope detection circuit 501. The envelope detection output from the envelope detection circuit 501 is actively used for timing signal generation.

It should be further noted that the function of the reproduction signal digitizer 201, PLL circuit 202, reference clock generator 203, and address reproducer 204 shown in FIG. 6 are the same as in the first embodiment shown in FIG. 2 above. In addition, the clock selector 301 and sector counter 302 shown in FIG. 6 are the same as those shown in FIG. 3. Yet further, the envelope detection circuit 501 and sector synchronization state monitor 503 shown in FIG. 6 are the same as those shown in FIG. 5. As a result, further description of these same parts is omitted below.

The gate signal generating circuit 601 generates and supplies the various gate signals for controlling the operation of other circuit blocks using the envelope detection output from the envelope detection circuit 501; counter output from sector counter 302; the sector synchronization state signal from sector synchronization state monitor 503; and the disc rotation state signal from the servo 105 in FIG. 1.

Figure 11:
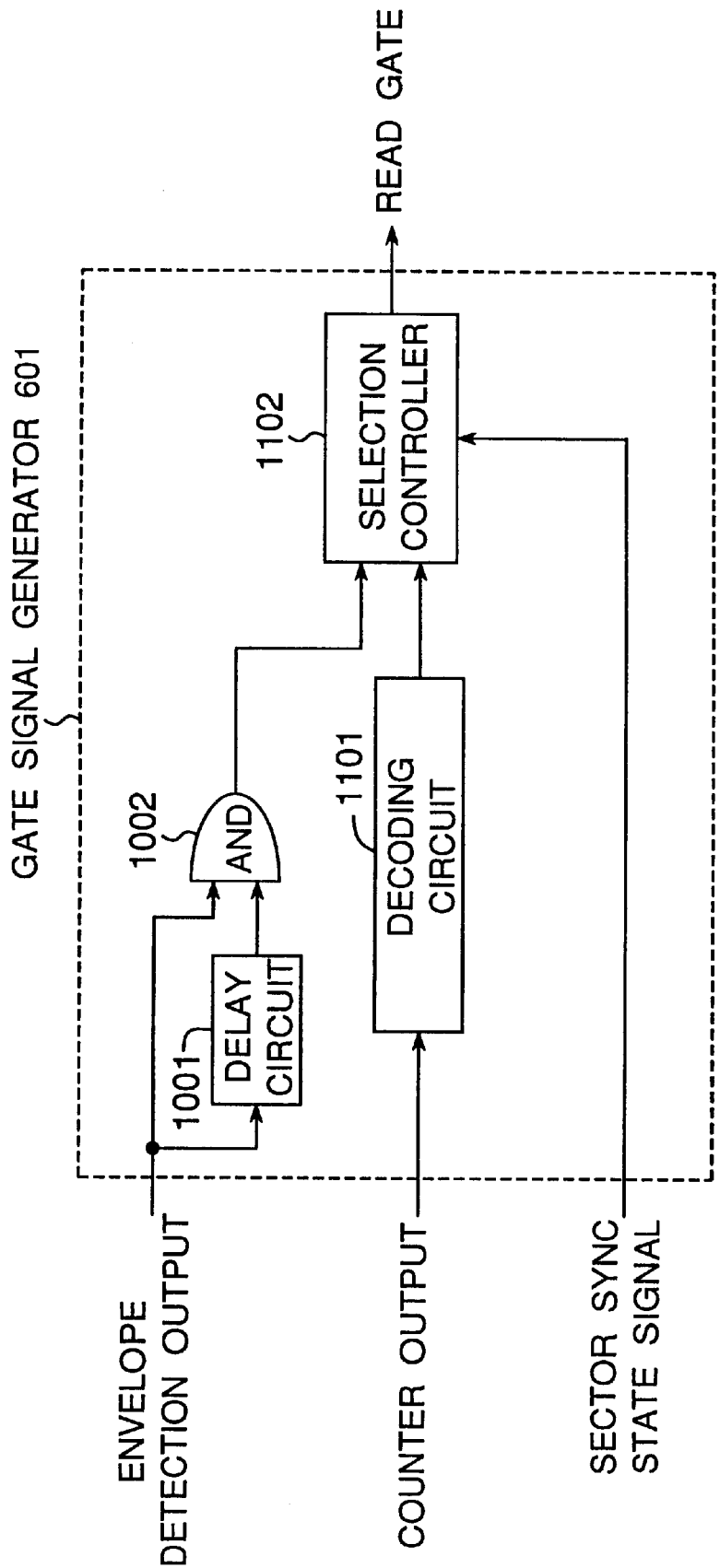
FIG. 11 is a block diagram showing an internal configuration of a gate signal generating circuit 601 in the timing signal generator 111 shown in FIG. 6 according to a fifth embodiment of the present invention.

FIG. 11 is a block diagram showing an internal configuration of a gate signal generating circuit 601 in the timing signal generator 111 shown in FIG. 6. A gate signal generating circuit 601 according to this preferred embodiment outputs a read gate for controlling operation of the reproduction signal digitizer 201 and PLL circuit 202 shown in FIG. 6.

A decoding circuit 1101 decodes the counter output from sector counter 302, and outputs a digital signal that goes high when the counter output is within a specific range. The delay circuit 1001 and AND circuit 1002 have the same function as described above with reference to FIG. 10, that is, the rising edge of the envelope detection output is delayed a specific period such that the high time of the output from the AND circuit 1002 is shortened an amount equal to the delay.

The selection control means 1102 selects the output from the AND circuit 1002 or decoding circuit 1101 as the read gate signal based on the current state of the four-state sector synchronization state signal described above, and the level of the disc rotation state signal.

The read gate selection logic based on the sector synchronization state signal and disc rotation state signal states is shown in truth Table 2 and described below.

TABLE 2

| Sector Sync State Signal | Disc Rotation State Signal | Read Gate Selection |
|---|---|---|
| Normal State "01" | L Level | Decoder Output |
| | H Level | |
| Interpolated State "10" | L Level | AND Output |
| | H Level | Decoder Output |
| Lock-in State "00" | L Level | AND Output |
| | H Level | |
| Stopped State "11" | L Level | L Level Fixed |
| | H Level | |

First, when the address information can be read normally and the normal sector synchronization state (01) is thus set, read gate output is based on the output of sector counter 302.

If the address information could not be read in the previous sector, but was read correctly within a specific number of preceding sectors (the interpolated sector synchronization state is set), read gate output is based on the envelope of the reproduction signal if the disc speed is not within a specific range; if the disc speed is within this range, read gate output is based on the output of sector counter 302.

If the address information cannot be read from a specific number of consecutive sectors, and the bit or byte position in a sector cannot be accurately indicated by the sector counter 302 output (the sector synchronization lock-in state is set), read gate output is based on the envelope of the reproduction signal.

It is therefore possible to set the read gate timing based on a reference enabling the location in a particular sector to be most accurately expressed under all operating conditions. Address and data reproduction can therefore be completed reliably at high speed.

It should be noted that when it is not necessary to read address information, such as in the sector synchronization stopped state, the read gate is fixed inactive (low), that is, the read gate does not go active (high in the present embodiment). The data reproduction operation of other circuit blocks, particularly the reproduction signal digitizer 201 and PLL circuit 202, can therefore be stopped and unnecessary power consumption can be reduced.

It should be noted that only one sector counter is needed for gate signal generation with a timing signal generator 111 comprised as shown in FIG. 6 and FIG. 11 because the read clock or reference clock is selected by the clock selector 301 and a single clock signal is passed to the sector counter. The scale of a timing signal generator 111 comprised as shown in FIG. 6 and FIG. 11 is thus smaller than that of the timing signal generator 111 shown in FIG. 5 and FIG. 10.

It will also be obvious that while the present embodiment has been described with reference to a method for generating read gate timing, it can also be used to determine the timing for any other gate signal where the gate signal level changes according to the sector byte position.

Figure 7:
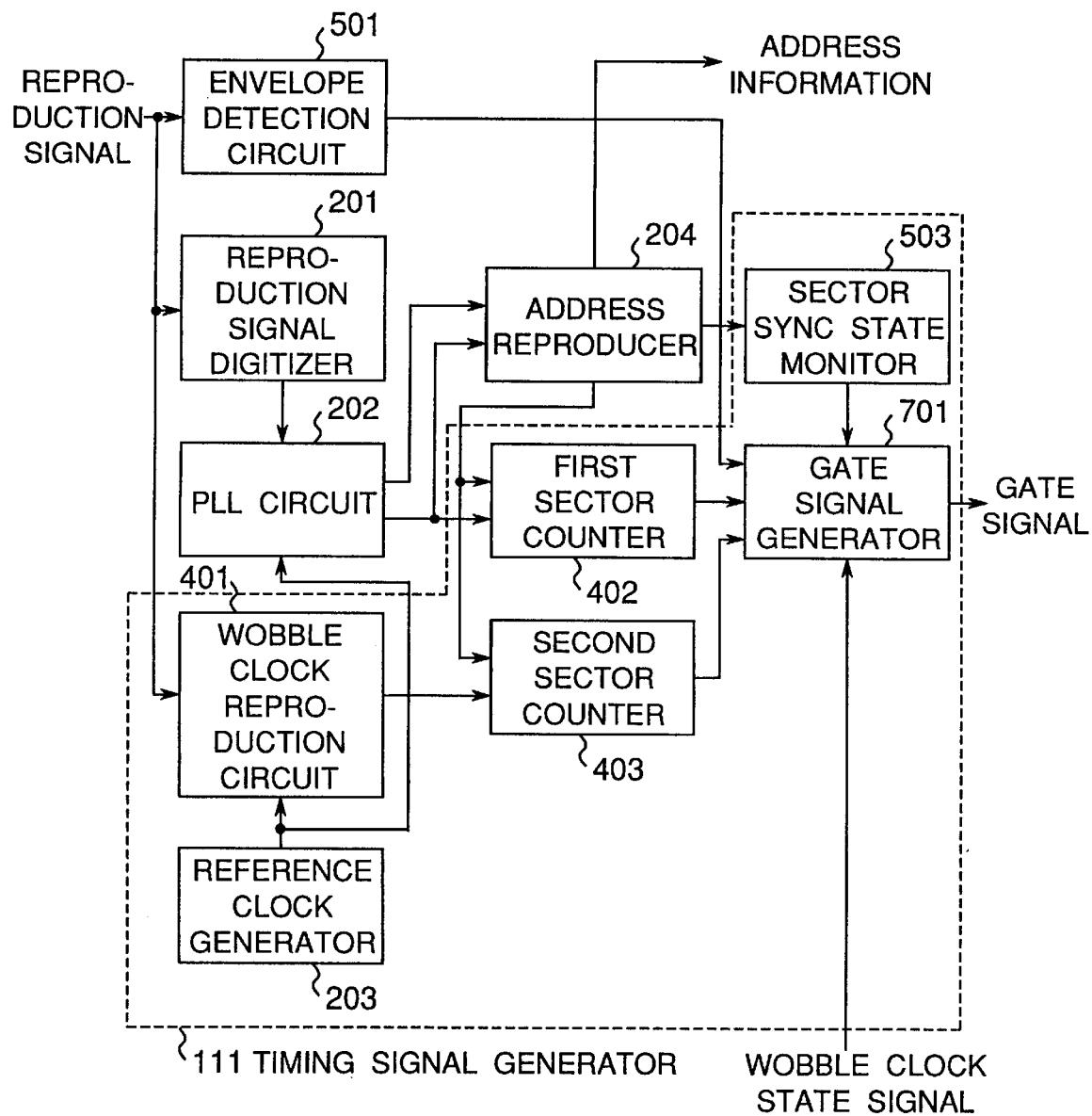
FIG. 7 is a block diagram of a timing signal generator 111 and surrounding components according to a sixth embodiment of the present invention.

FIG. 7 is a block diagram of a timing signal generator 111 and surrounding components according to a sixth embodiment of the present invention.

Similarly to the timing signal generator 111 shown in FIG. 5 as a further development of the timing signal generator 111 shown in FIG. 2, the timing signal generator 111 shown FIG. 7 is a timing signal generator 111 as shown in FIG. 4 further comprising an envelope detection circuit 501 for detecting the reproduction signal envelope. The envelope detection output from the envelope detection circuit 501 is actively used for timing signal generation.

It should be further noted that the function of the reproduction signal digitizer 201, PLL circuit 202, reference clock generator 203, and address reproducer 204 shown in FIG. 7 are the same as in the first embodiment shown in FIG. 2 above. In addition, the wobble clock reproduction circuit 401, first sector counter 402, and second sector counter 403, have the same function as those shown in FIG. 4. Yet further, the envelope detection circuit 501 and sector synchronization state monitor 503 shown in FIG. 7 are the same as those shown in FIG. 5. As a result, further description of these same parts is omitted below.

The gate signal generating circuit 701 generates and supplies the various gate signals for controlling the operation of other circuit blocks using the envelope detection output from the envelope detection circuit 501; the first counter output from first sector counter 402; second counter output from second sector counter 403; the sector synchronization state signal from sector synchronization state monitor 503; and the wobble clock state signal from wobble clock reproduction circuit 401.

Figure 14:
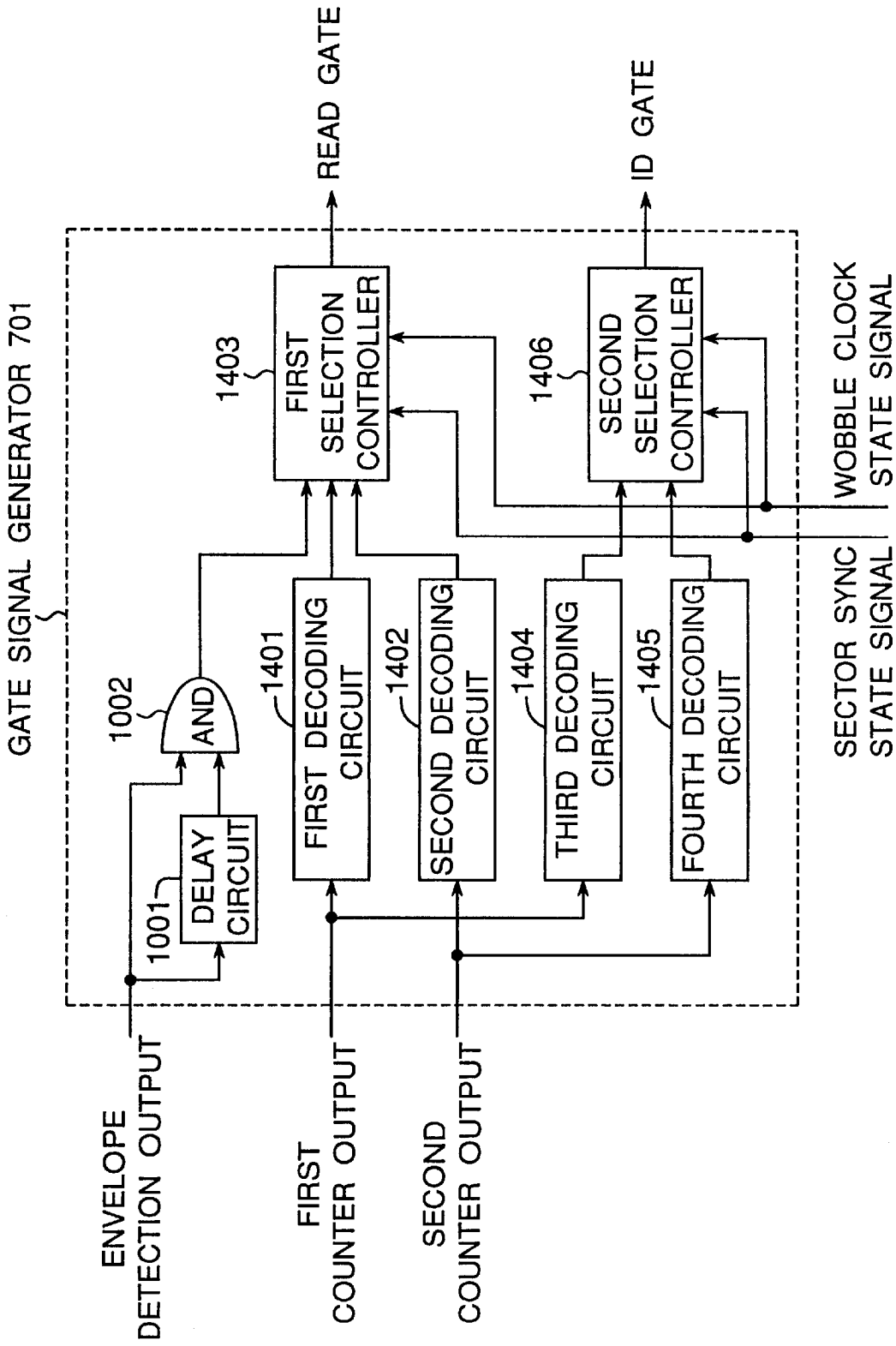
FIG. 14 is a block diagram showing an internal configuration of a gate signal generating circuit 701 in a timing signal generator 111 shown in FIG. 7 according to a sixth embodiment of the present invention.

FIG. 14 is a block diagram showing an internal configuration of a gate signal generating circuit 701 in the timing signal generator 111 shown in FIG. 7. A gate signal generating circuit 701 according to this preferred embodiment outputs a read gate for controlling operation of the reproduction signal processor 106 shown in FIG. 1, part of which is equivalent to the reproduction signal digitizer 201 and PLL circuit 202 shown in FIG. 7.

This gate signal generating circuit 701 also outputs an ID gate used for switching the signal separation and signal detection method in the header area and data recording area. For example, if the polarity of the reproduction signal must be reversed in the header area and data recording area, the reproduction signal could be detected using a difference signal in the header area, and a sum signal in the data recording area.

The delay circuit 1001 and AND circuit 1002 have the same function as described above with reference to FIG. 10, that is, the rising edge of the envelope detection output is delayed a specific period such that the high time of the output from the AND circuit 1002 is shortened an amount equal to the delay.

Decoding circuits 1401 and 1404 each decode the first counter output, and output a digital signal that goes high when the first counter output is within a specific range.

Decoding circuits 1402 and 1405 each decode the second counter output, and output a digital signal that goes high when the second counter output is within a specific range.

A first selection controller 1403 selects the output from the AND circuit 1002 or decoding circuit 1401 as the read gate signal based on the level of the wobble clock state signal and the current state of the four-state sector synchronization state signal described above.

The read gate selection logic based on the sector synchronization state signal and wobble clock state signal states is shown in truth Table 3 and described below.

TABLE 3

| Sector Sync State Signal | Wobble Clock State Signal | Read Gate Selection |
| --- | --- | --- |
| Normal State "01" | L Level<br>H Level | 1st Decoder Output<br>2nd Decoder Output |
| Interpolated State "10" | L Level<br>H Level | AND Output<br>2nd Decoder Output |
| Lock-in State "00" | L Level<br>H Level | AND Output |
| Stopped State "11" | L Level<br>H Level | L Level Fixed |

First, when the address information can be read normally and the normal sector synchronization state is thus set, read gate output is based on the output of the first sector counter 402, which is synchronized to the read clock, if the wobble clock is not phase locked to the wobble signal on disc; if the wobble clock is phase locked, read gate output is based on the output of the second sector counter 403, synchronized to the wobble clock.

If the address information could not be read in the previous sector, but was read correctly within a specific number of preceding sectors (the interpolated sector synchronization state is set), read gate output is based on the envelope of the reproduction signal if the wobble clock is not phase locked to the wobble signal on disc; if the wobble clock is phase locked, read gate output is based on the output of the second sector counter 403, synchronized to the wobble clock.

If the address information cannot be read from a specific number of consecutive sectors, and the bit or byte position in a sector cannot be accurately indicated by the output of either first sector counter 402 or second sector counter 403 (the sector synchronization lock-in state is set), read gate output is based on the envelope of the reproduction signal.

It is therefore possible to set the read gate timing based on a reference enabling the location in a particular sector to be most accurately expressed under all operating conditions. Address and data reproduction can therefore be completed reliably at high speed.

It should be noted that when it is not necessary to read address information, such as in the sector synchronization stopped state, the read gate is fixed inactive (low), that is, the read gate does not go active (high in the present embodiment). The data reproduction operation of other circuit blocks, particularly the reproduction signal digitizer 201 and PLL circuit 202, can therefore be stopped, and unnecessary power consumption can be reduced.

A second selection controller 1406 selects the output from decoding circuit 1404 or decoding circuit 1405 as the ID gate signal based on the level of the wobble clock state signal and the current state of the four-state sector synchronization state signal described above.

The ID gate selection logic based on the sector synchronization state signal and wobble clock state signal states is shown in truth Table 4 and described below.

TABLE 4

| Sector Sync State Signal | Wobble Clock State Signal | ID Gate Selection |
| --- | --- | --- |
| Normal State "01" | L Level<br>H Level | 3rd Decoder Output<br>4th Decoder Output |
| Interpolated State "10" | L Level<br>H Level | 3rd Decoder Output<br>4th Decoder Output |
| Lock-in State "00" | L Level<br>H Level | H Level Fixed |
| Stopped State "11" | L Level<br>H Level | H Level Fixed |

First, when the address information can be read normally and the normal sector synchronization state is thus set, or the address information could not be read in the previous sector, but was read correctly within a specific number of preceding sectors (the interpolated sector synchronization state is set), ID gate output is based on the output of the first sector counter 402, which is synchronized to the read clock, if the wobble clock is not phase locked to the wobble signal on disc; if the wobble clock is phase locked, ID gate output is based on the output of the second sector counter 403, synchronized to the wobble clock.

The ID gate signal at this time assures a high signal level in the header area and a low signal level in the data recording area in order to ensure reliable selection of the signal separation and detection methods required for reproducing address information in the header area, and recording/reproducing user data in the data recording area. As a result, the ID gate goes high timed to ensure that the header area will be covered. As noted in the description of the related art above, there are typically gap and buffer areas to which no signals are recorded before and after the data recording area in most common rewritable optical disc formats, and there is therefore a certain tolerance in the timing precision required for the ID gate. A certain offset in ID gate synchronization can therefore be tolerated in the interpolated sector synchronization state.

If the address information cannot be read from a specific number of consecutive sectors, and the bit or byte position in a sector cannot be accurately indicated by the output of either first sector counter 402 or second sector counter 403 (the sector synchronization lock-in state is set), the ID gate signal is held active (high) because address reproduction must be continued to locate a sector as soon as possible.

It is therefore possible to set the ID gate timing based on a reference enabling the location in a particular sector to be most accurately expressed under all operating conditions. Address and data reproduction can therefore be completed reliably at high speed.

It should be noted that when it is not necessary to read address information, such as in the sector synchronization stopped state, the ID gate can be low or high because it is not necessary to change the signal separation and detection method.

Figure 15:
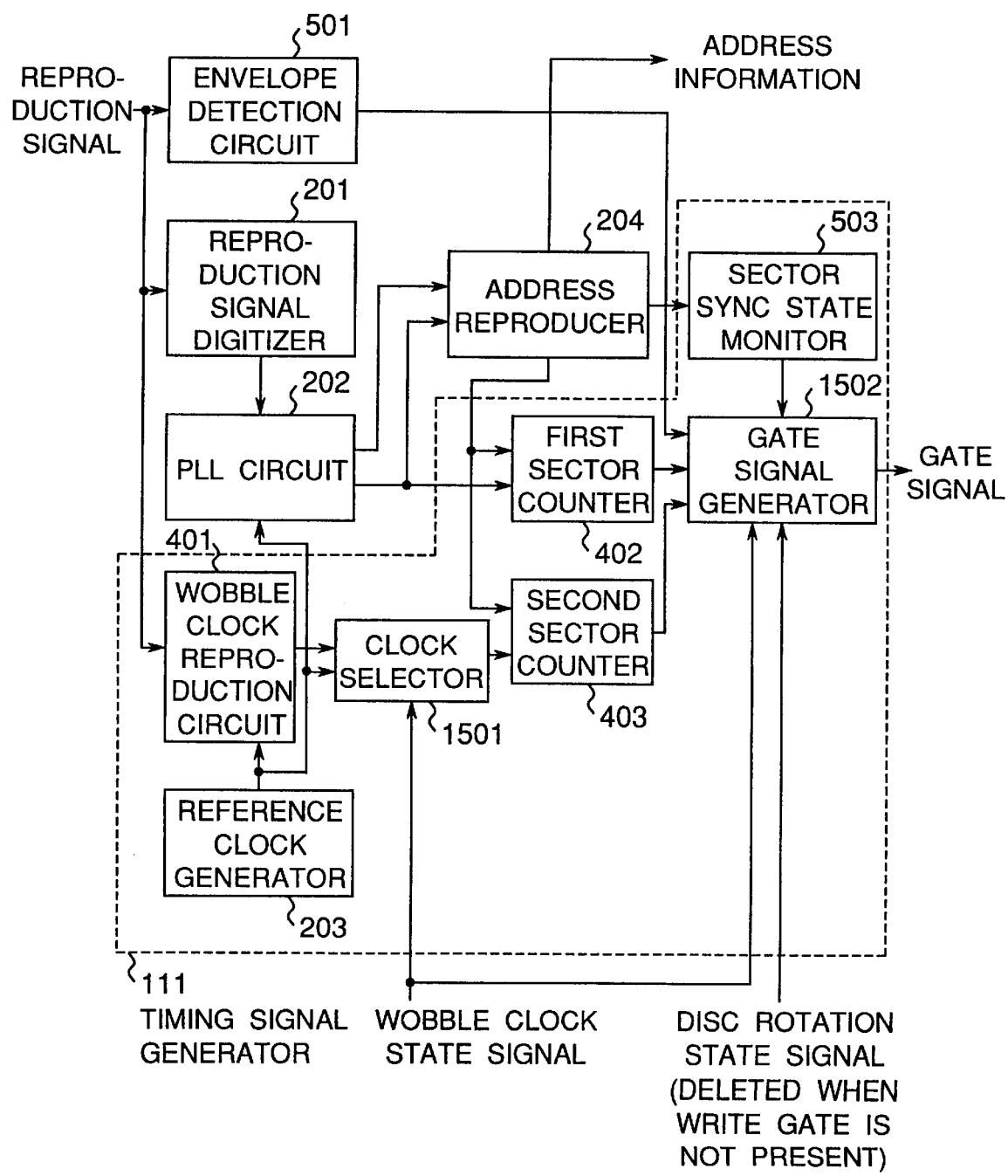
FIG. 15 is a block diagram of a timing signal generator 111 and surrounding components according to a seventh embodiment of the present invention.

FIG. 15 is a block diagram of a timing signal generator 111 and surrounding components according to a seventh embodiment of the present invention. The timing signal generator 111 shown in FIG. 15 is the timing signal generator 111 shown in FIG. 7 further comprising a clock selector 1501 for selecting a reference clock or wobble clock. The clock selected by the clock selector 1501 is supplied to the second sector counter 403.

It should be further noted that the function of the reproduction signal digitizer 201, PLL circuit 202, reference clock generator 203, and address reproducer 204 shown in FIG. 15 are the same as in the first embodiment shown in FIG. 2 above. In addition, the wobble clock reproduction circuit 401, first sector counter 402, and second sector counter 403, have the same function as those shown in FIG. 4. Yet further, the envelope detection circuit 501 and sector synchronization state monitor 503 shown in FIG. 15 are the same as those shown in FIG. 5. As a result, further description of these same parts is omitted below.

As noted above, the reference clock from the reference clock generator 203, and the wobble clock from the wobble clock reproduction circuit 401, are supplied to the clock selector 1501. The wobble clock state signal is also supplied from the wobble clock reproduction circuit 401. The clock selector 1501 thus selects and outputs the reference clock or the wobble clock based on the level of the wobble clock state signal. That is, when the wobble clock state signal is high (the wobble clock is phase locked to the wobble signal), the wobble clock is selected and output; when low, the reference clock is selected and output.

The gate signal generating circuit 1502 generates and supplies the various gate signals for controlling the operation of other circuit blocks using the envelope detection output from the envelope detection circuit 501; the first counter output from first sector counter 402; second counter output from second sector counter 403; the sector synchronization state signal from sector synchronization state monitor 503; the disc rotation state signal from the servo 105 in FIG. 1; and the wobble clock state signal from wobble clock reproduction circuit 401.

Figure 16:
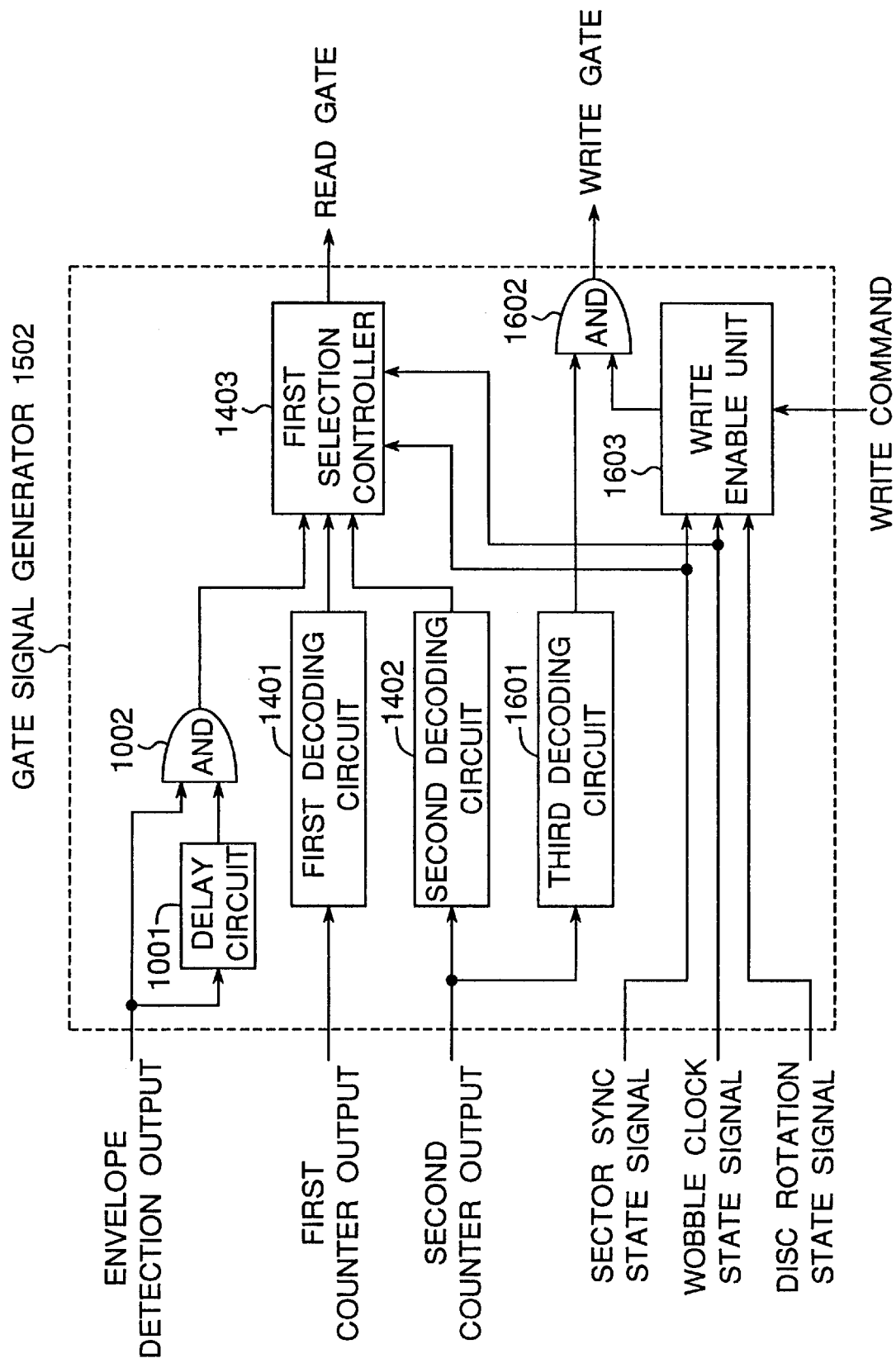
FIG. 16 is a block diagram showing an internal configuration of a gate signal generating circuit 1502 in the timing signal generator 111 shown in FIG. 15 according to a seventh embodiment of the present invention.

FIG. 16 is a block diagram showing an internal configuration of a gate signal generating circuit 1502 in the timing signal generator 111 shown in FIG. 15. A gate signal generating circuit 1502 according to this preferred embodiment outputs a read gate for controlling digitizing and PLL operations in the reproduction signal processor 106 shown in FIG. 1, part of which is equivalent to the reproduction signal digitizer 201 and PLL circuit 202 shown in FIG. 7. This gate signal generating circuit 1502 also outputs a write gate to the laser driver 108 to enable emitting at the laser power level required for data recording when recording is requested.

The delay circuit 1001 and AND circuit 1002 shown in FIG. 16 have the same function as described above with reference to FIG. 10. The first decoding circuit 1401, second decoding circuit 1402, and first selection controller 1403 in FIG. 16 have the same function as described above with reference to FIG. 14. Further description of these same parts is therefore omitted below.

A third decoding circuit 1601 decodes the counter output from the second sector counter 403 shown in FIG. 15, and outputs a digital signal that goes high when this second counter output is within a specific range.

The decoded output from the third decoding circuit 1601, and the write enable signal from the write enable unit 1603, are supplied to a second AND circuit 1602. The second AND circuit 1602 obtains the logical AND of the inputs, and outputs the result to the laser driver 108 as the write gate signal.

The write enable unit 1603 outputs a write enable signal to mask the write gate as required based on the current state of the four-state sector synchronization state signal described above, the level of the wobble clock state signal, and the level of the disc rotation state signal.

The write gate selection logic based on the sector synchronization state signal and wobble clock state signal states is shown in truth Table 5 and described below.

TABLE 5

| Sector Sync State Signal | Wobble Clock State Signal | Disc Rotation State Signal | Record Permit Signal |
| --- | --- | --- | --- |
| Normal State "01" | L Level | L Level | L Level |
| | | H Level | H Level |
| | H Level | L Level | |
| | | H Level | |
| Interpolated State "10" | L Level | L Level | L Level |
| | | H Level | |
| | H Level | L Level | L Level/H Level Selectable |
| | | H Level | |
| Lock-in State "00" | L Level | L Level | L Level |
| | | H Level | |
| | H Level | L Level | |
| | | H Level | |
| Stopped State "11" | L Level | L Level | |
| | | H Level | |
| | H Level | L Level | |
| | | H Level | |

First, when the address information can be read normally (a normal sector synchronization state is set), and either the wobble clock state signal or disc rotation state signal is high, the write enable signal goes high to enable writing (recording).

If the address information could not be read in the previous sector, but was read correctly within a specific number of preceding sectors (the interpolated sector synchronization state is set), the write enable signal goes low (a write disabled state) if the wobble clock state signal is low; if the wobble clock state signal is high, the write enable signal can be set high or low to enable writing as desired.

If the address information cannot be read from a specific number of consecutive sectors, and the bit or byte position in a sector cannot be accurately indicated by the output of either first sector counter 402 or second sector counter 403 (the sector synchronization lock-in state is set), or if it is not necessary to read address information (sector synchronization stopped state), the write enable signal is fixed low.

It is therefore possible to set the write gate active (high in the present embodiment) only when the write enable signal is high. It is therefore also possible to permit data recording only when the second counter output accurately represents a precise sector bit or byte position. The reliability of data recording operations can thus be improved.

It should also be noted that when the interpolated sector synchronization state is set and the wobble clock state signal is high, the write gate can be set active even when the address information cannot be continuously read correctly by adjusting the level of the write enable signal.

It should be further noted that because the write gate is generated synchronized to the wobble clock when the wobble clock state signal is high, this preferred embodiment as shown in FIGS. 15 and 16 can also enable recording when the disc speed is not within the specified range. When the wobble clock state signal is low, the write gate is generated synchronized to the reference clock. As a result, recording can also be enabled insofar as the disc speed is within a specified range even if the wobble clock phase is not synchronized.

Compared with a device according to the prior art, recording is therefore possible under a wider range of conditions with a timing signal generator 111 according to this preferred embodiment. Data recording can therefore occur more quickly, and optical disc drive performance is thus improved.

As will be known from the above descriptions of the preferred embodiments, an optical disc drive according to the present invention can measure a specific sector bit or byte position on an optical disc using both a read clock obtained from the reproduction signal, and a reference clock of a specific period. It is therefore possible to generate the timing for sector synchronized gate signals insofar as one of the clocks is output at the rated frequency, even if the disc speed is not within a specified range or the read clock quality is poor.

Stable address information reading is therefore possible even when the disc speed deviates from the specified range as a result of a seek operation crossing multiple zones on a ZCLV type disc, or PLL locking is lost due to a disc error and read clock frequency is shifted.

It will also be obvious that an optical disc drive according to the present invention can monitor address information reading in each sector, determine the sector synchronization state based on the monitored output, and switch the gate signal timing method according to the sector synchronization state and the disc rotation state.

It is therefore possible to consistently set gate timing based on a reference enabling the location in a particular sector to be most accurately expressed under all operating conditions. Data recording and reproduction can therefore be completed with high reliability at high speed.

The present invention also provides a timing signal generator for generating a write gate signal, and processing and recording data, using a clock reproduced from a wobble groove or clock pits when this clock is phase locked. When this clock is not phase locked, a reference clock derived from a quartz oscillator, frequency synthesizer, or other device can be used for generating a write gate signal, and processing and recording data, when the disc speed is within a specified range.

It is therefore possible to record data even when the disc speed deviates from a defined disc speed range, and when a clock cannot be reproduced from a wobble groove or clock pits due to disc errors. As a result, data recording and reproduction can be completed with high reliability at high speed.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. An optical disc drive comprising:
a signal reading arrangement that reads a signal from an optical disc;
a recording arrangement that records information to the optical disc;
a clock reproducing arrangement that reproduces a first clock from a reproduction signal read by the signal reading arrangement;
an address reproducer that reproduces an address from the reproduction signal read by the signal reading arrangement;
a reference clock generator that generates a second clock, which is used as a reference for recording;
a first counter that counts a length of one sector on the optical disc using the first clock, wherein said first counter is preset to a specific count when the address reproducer reproduces an address;
a second counter that counts a length of one sector on the optical disc using the second clock, wherein said second counter is preset to a specific count when the address reproducer reproduces an address;
a generator that generates a first disc rotation state signal when the disc rotation is out of a specific speed, and a second disc rotation state signal when the disc rotation is at said specific speed; and
a timing signal generator that generates a timing signal for controlling operation of the recording arrangement and clock reproducing arrangement using counter output from the first counter when said first disc rotation state signal is produced and the second counter when said second disc rotation state signal is produced.

2. An optical disc drive comprising:
a signal reading arrangement that reads a signal from an optical disc;
a recording arrangement that records information to the optical disc;
a clock reproducing arrangement that reproduces a first clock from a reproduction signal read by the signal reading arrangement;
an address reproducer that reproduces an address from the reproduction signal read by the signal reading arrangement;
a reference clock generator that generates a second clock, which is used as a reference for recording;
a generator that generates a first disc rotation state signal when the disc rotation is out of a specific speed, and a second disc rotation state signal when the disc rotation is at said specific speed;
a clock selector that selects the first clock when the first disc rotation state signal is produced, and the second clock when the second disc rotation state signal is produced, so that said first and second clocks are combined in a time sharing manner to present a third clock;
a counter that counts a length of one sector on the optical disc using the third clock, said counter being preset to a specific count when said address reproducer reproduces an address; and
a timing signal generator that generates a timing signal for controlling operation of the recording arrangement and clock reproducing arrangement using counter output from the counter.

3. An optical disc drive comprising:
a signal reading arrangement that reads a signal from an optical disc;
a recording arrangement that records information to the optical disc;
a clock reproducing arrangement that reproduces a first clock from a reproduction signal read by the signal reading arrangement;
a clock reproducing arrangement that reproduces a wobble clock from a reproduction signal read by the signal reading arrangement;
an address reproducer that reproduces an address from the reproduction signal read by the signal reading arrangement;
a first counter that counts a length of one sector on the optical disc using the first clock, wherein said first counter is preset to a specific count when the address reproducer reproduces an address;
a second counter that counts a length of one sector on the optical disc using the wobble clock, wherein said second counter is preset to a specific count when the address reproducer reproduces an address;

a generator that generates a first wobble clock state signal when the wobble clock is not in a phase locked condition and a second wobble clock state signal when the wobble clock is in a phase locked condition; and a timing signal generator that generates a timing signal for controlling operation of the recording arrangement and clock reproducing arrangement using counter output from the first counter when said first wobble clock state signal is produced and the second counter when said second wobble clock state signal is produced.

4. The optical disc drive as set forth in claim 3, wherein the signal reading arrangement reads at least address information and user data recorded to an optical disc as the reproduction signal; and the first clock reproducing arrangement reproduces as the first clock a clock synchronized to the channel bit period of the address information or user data.

5. The optical disc drive as set forth in claim 3, wherein the signal reading arrangement reads a signal from clock pits preformed at a specific period to an optical disc track for reproducing a clock; and the second clock reproducing arrangement reproduces as the second clock a clock synchronized to the period of the clock pits.

6. The optical disc drive as set forth in claim 3, wherein the signal reading arrangement reads a signal from an optical disc having a groove undulating at a specific frequency formed thereon as a track; and the second clock reproducing arrangement reproduces as the second clock a clock synchronized to the undulation frequency of the groove.

7. An optical disc drive comprising:

a signal reading arrangement that reads a signal from an optical disc;

a recording arrangement that records information to the optical disc;

an envelope detector that detects an envelope of a reproduction signal read by the signal reading arrangement, and produces an envelope detection signal;

a clock reproducing arrangement that reproduces a first clock from a reproduction signal read by the signal reading arrangement;

an address reproducer that reproduces an address from the reproduction signal read by the signal reading arrangement;

a reference clock generator that generates a second clock, which is used as a reference for recording;

a first counter that counts a length of one sector on the optical disc using the first clock, wherein said first counter is preset to a specific count when the address reproducer reproduces an address;

a second counter that counts a length of one sector on the optical disc using the second clock, wherein said second counter is preset to a specific count when the address reproducer reproduces an address;

a generator that generates a first disc rotation state signal when the disc rotation is out of a specific speed, and a second disc rotation state signal when the disc rotation is at said specific speed;

a sector sync state monitor that produces a normal sector sync state signal when an address is properly reproduced, an interpolated sector sync state signal when an address is properly reproduced at least once in the preceding predetermined number of sectors, and sector sync lock-in state signal when no address is properly reproduced in the preceding predetermined number of sectors;

a timing signal generator that generates a timing signal for controlling operation of the recording arrangement and clock reproducing arrangement using selectively one of counter output from the first counter, counter output from the second counter and said envelope detection signal, in accordance with a combination of a signal generated from said generator and a signal generated from said sector sync state monitor.

8. An optical disc drive comprising:

a signal reading arrangement that reads a signal from an optical disc;

a recording arrangement that records information to the optical disc;

an envelope detector that detects an envelope of a reproduction signal read by the signal reading arrangement, and produces an envelope detection signal;

a clock reproducing arrangement that reproduces a first clock from a reproduction signal read by the signal reading arrangement;

an address reproducer that reproduces an address from the reproduction signal read by the signal reading arrangement;

a reference clock generator that generates a second clock, which is used as a reference for recording;

a clock selector that selects the first clock when the first disc rotation state signal is produced, and the second clock when the second disc rotation state signal is produced, so that said first and second clocks are combined in a time sharing manner to present a third clock;

a counter that counts a length of one sector on the optical disc using the third clock, said counter being preset to a specific count when said address reproducer reproduces an address;

a generator that generates a first disc rotation state signal when the disc rotation is out of a specific speed, and a second disc rotation state signal when the disc rotation is at said specific speed;

a sector sync state monitor that produces a normal sector sync state signal when an address is properly reproduced, an interpolated sector sync state signal when an address is properly reproduced at least once in the preceding predetermined number of sectors, and sector sync lock-in state signal when no address is properly reproduced in the preceding predetermined number of sectors; and a timing signal generator that generates a timing signal for controlling operation of the recording arrangement and clock reproducing arrangement using selectively one of counter output and said envelope detection signal, in accordance with a combination of a signal generated from said generator and a signal generated from said sector sync state monitor.

9. An optical disc drive comprising:

a signal reading arrangement that reads a signal from an optical disc;

a recording arrangement that records information to the optical disc;

an envelope detector that detects an envelope of a reproduction signal read by the signal reading arrangement, and produces an envelope detection signal;

a first clock reproducing arrangement that reproduces a first clock from a reproduction signal read by the signal reading arrangement;

a second clock reproducing arrangement that reproduces a wobble clock from a reproduction signal read by the signal reading arrangement;

an address reproducer that reproduces an address from the reproduction signal read by the signal reading arrangement;

a first counter that counts a length of one sector on the optical disc using the first clock, wherein said first counter is preset to a specific count when the address reproducer reproduces an address;

a second counter that counts a length of one sector on the optical disc using the wobble clock, wherein said second counter is preset to a specific count when the address reproducer reproduces an address;

a generator that generates a first wobble clock state signal when the wobble clock is not in a phase locked condition and a second wobble clock state signal when the wobble clock is in a phase locked condition; and a sector sync state monitor that produces a normal sector sync state signal when an address is properly reproduced, an interpolated sector sync state signal when an address is properly reproduced at least once in the preceding predetermined number of sectors, and sector sync lock-in state signal when no address is properly reproduced in the preceding predetermined number of sectors; and a timing signal generator that generates a timing signal for controlling operation of the recording arrangement and clock reproducing arrangement using selectively one of counter output from the first counter, counter output from the second counter and said envelope detection signal, in accordance with a combination of a signal generated from said generator and a signal generated from said sector sync state monitor.

10. The optical disc drive as set forth in claim 9, wherein the signal reading arrangement reads at least address information and user data recorded to an optical disc as the reproduction signal; and the first clock reproducing arrangement reproduces as the first clock a clock synchronized to a pit frequency of the address information or user data.

11. The optical disc drive as set forth in claim 9, wherein the signal reading arrangement reads a signal from clock pits preformed at a specific period to an optical disc track for reproducing a clock; and the second clock reproducing arrangement reproduces as the second clock a clock synchronized to the period of the clock pits.

12. The optical disc drive as set forth in claim 9, wherein the signal reading arrangement reads a signal from an optical disc having a groove undulating at a specific frequency formed thereon as a track; and the second clock reproducing arrangement reproduces as the second clock a clock synchronized to the undulation frequency of the groove.

13. A timing signal generator for generating a timing signal required for recording and reproducing in an optical disc drive in which information is recorded and reproduced in sector units on an optical disc said timing signal generator comprising:

a first counter that counts a length of one sector on the optical disc using a first clock reproduced from the optical disc;

a second counter that counts a length of one sector on the optical disc using a second clock, which is used as a reference for recording to the optical disc;

a first decoding circuit that decodes counter output from the first counter, and generates a first gate signal of a specific width;

a second decoding circuit that decodes counter output from the second counter, and generates a second gate signal of a specific width;

a generator that generates a first disc rotation state signal when the disc rotation is out of a specific speed, and a second disc rotation state signal when the disc rotation is at said specific speed; and a selection circuit selecting the first gate signal when said first disc rotation state signal is produced, and second gate signal when said second disc rotation state signal is produced, and outputting a selected gate signal as a timing signal.

14. A timing signal generator for generating a timing signal required for recording and reproducing in an optical disc drive in which information is recorded and reproduced in sector units on an optical disc, said timing signal generator comprising:

a first counter that counts a length of one sector on the optical disc using a first clock reproduced from the optical disc;

a second counter that counts a length of one sector on the optical disc using a wobble clock from a reproduction signal read by a signal reading arrangement;

a first decoding circuit that decodes counter output from the first counter, and generates a first gate signal of a specific width;

a second decoding circuit that decodes counter output from the second counter, and generates a second gate signal of a specific width;

a generator that generates a first wobble clock state signal when the wobble clock is not in a phase locked condition and a second wobble clock state signal when the wobble clock is in a phase locked condition; and a selection circuit that selects the first gate signal when said first wobble clock state signal is produced, and second gate signal when said second wobble clock state signal is produced, and outputting a selected gate signal as a timing signal.

15. A timing signal generator for generating a timing signal required for recording and reproducing in an optical disc drive in which information is recorded and reproduced in sector units while reading address information preassigned to each sector unit, wherein sector units are formed by segmenting a track on an optical disc into a plurality of segments, said timing signal generator comprising:

a delay circuit that delays by a specific delay time an envelope signal detected from a signal reproduced from the optical disc;

an AND circuit that obtains an AND of the envelope signal and the delayed output from the delay circuit;

a first counter that counts a length of one sector on the optical disc using a first clock reproduced from the optical disc;

a second counter that counts a length of one sector on the optical disc using a second clock, which is used as a reference for recording to the optical disc;

a first decoding circuit that decodes counter output from the first counter, and generating a first gate signal of a specific width;

a second decoding circuit that decodes counter output from the second counter, and generating a second gate signal of a specific width; and a selection circuit that selects any one of the AND circuit output, the first gate signal, and the second gate signal based on the condition of optical disc rotation and the address information read state, and outputting the selected signal as a timing signal.

16. A timing signal generator for generating a timing signal required for recording and reproducing in an optical disc drive in which information is recorded and reproduced in sector units while reading address information preassigned to each sector unit, wherein sector units are formed by segmenting a track on an optical disc into a plurality of segments, said timing signal generator comprising:

a delay circuit that delays by a specific delay time an envelope signal detected from a signal reproduced from the optical disc;

an AND circuit that obtains an AND of the envelope signal and the delayed output from the delay circuit;

a first counter that counts a length of one sector on the optical disc using a first clock reproduced from the optical disc;

a second counter that counts a length of one sector on the optical disc using a wobble clock from a reproduction signal read by a signal reading arrangement;

a first decoding circuit that decodes counter output from the first counter, and generating a first gate signal of a specific width;

a second decoding circuit that decodes counter output from the second counter, and generating a second gate signal of a specific width; and a selection circuit that selects any one of the AND circuit output, the first gate signal, and the second gate signal based on the second clock state and the address information read state, and outputting the selected signal as a timing signal.

17. An information recording and reproducing method for recording and reproducing information in sector units on an optical disc while reading address information preassigned to each sector unit, wherein sector units are formed by segmenting a track on an optical disc into a plurality of segments, said method comprising:

an address error monitoring step for monitoring address information read errors in sector units;

a disc rotation state monitoring step for monitoring whether the optical disc speed is within a specific range;

a sector synchronization state evaluation step for evaluating the sector synchronization state based on the address error state monitored by the address error monitoring step; and a recording/reproducing enabling step for enabling recording or reproducing information based on the disc rotation state monitored by the disc rotation state monitoring step, and the sector synchronization state determined by the sector synchronization state evaluation step.

18. An information recording and reproducing method for recording and reproducing information in sector units on an optical disc by obtaining address information and a recording clock, which is used as a reference for recording information, from a signal reproduced from the optical disc, wherein said sector units are formed by segmenting an optical disc track into a plurality of segments, and address information is preassigned to each sector, the information recording and reproducing method comprising:

an address error monitoring step for monitoring address information read errors in sector units;

a recording clock state monitoring step for monitoring a state of the recording clock;

a sector synchronization state evaluation step for evaluating the sector synchronization state based on the address error state monitored by the address error monitoring step; and a recording/reproducing enabling step for enabling recording or reproducing information based on the sector synchronization state determined by the sector synchronization state evaluation step, and the recording clock state.

* * * * *